United States Patent
Tsubouchi et al.

(10) Patent No.: US 10,623,055 B2
(45) Date of Patent: Apr. 14, 2020

(54) RECEPTION APPARATUS, TRANSMISSION APPARATUS, AND COMMUNICATION SYSTEM

(71) Applicant: Toshiba Memory Corporation, Minato-ku, Tokyo (JP)

(72) Inventors: Yuta Tsubouchi, Tokyo (JP); Daisuke Miyashita, Kawasaki Kanagawa (JP); Junji Wadatsumi, Ota Tokyo (JP); Jun Deguchi, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/919,657

(22) Filed: Mar. 13, 2018

(65) Prior Publication Data
US 2019/0089407 A1 Mar. 21, 2019

(30) Foreign Application Priority Data
Sep. 19, 2017 (JP) .................................. 2017-179213

(51) Int. Cl.
*H04L 25/02* (2006.01)
*H04B 3/46* (2015.01)
*H04B 3/56* (2006.01)

(52) U.S. Cl.
CPC ................. *H04B 3/46* (2013.01); *H04B 3/56* (2013.01); *H04L 25/028* (2013.01); *H04L 25/0292* (2013.01)

(58) Field of Classification Search
CPC ........... H04B 3/46; H04B 3/56; H04L 25/028; H04L 25/0292
See application file for complete search history.

(56) References Cited

U.S. PATENT DOCUMENTS

| 6,463,266 B1 * | 10/2002 | Shohara ..................... H03J 7/04 375/219 |
| 7,512,395 B2 | 3/2009 | Beukema et al. |
| 9,991,994 B1 * | 6/2018 | Jiang ....................... H04L 1/205 |

(Continued)

FOREIGN PATENT DOCUMENTS

| JP | 3892361 B2 | 3/2007 |
| JP | 4843685 B2 | 12/2011 |
| JP | 5724622 B2 | 5/2015 |

*Primary Examiner* — Syed Haider
(74) *Attorney, Agent, or Firm* — White & Case LLP

(57) ABSTRACT

According to one embodiment, in a reception apparatus, a reception node is capable of being connected to a wired communication channel. A first frequency conversion circuit is electrically connected to the reception node. A second frequency conversion circuit is electrically connected to the reception node. A first adder circuit is electrically connected to the first frequency conversion circuit. A second adder circuit is electrically connected to the second frequency conversion circuit. A first correction circuit is electrically connected between the first frequency conversion circuit and the second adder circuit. A second correction circuit is electrically connected between the second frequency conversion circuit and the first adder circuit. The first correction circuit includes a reverse phase amplifier and a first capacitative element. The second correction circuit includes a positive phase amplifier and a second capacitative element.

19 Claims, 19 Drawing Sheets

(56) References Cited

U.S. PATENT DOCUMENTS

| | | | | |
|---|---|---|---|---|
| 2007/0099582 A1* | 5/2007 | Chen | ............... | H04B 1/0071 |
| | | | | 455/76 |
| 2011/0228826 A1* | 9/2011 | Yokoo | ............ | H04L 27/0014 |
| | | | | 375/219 |
| 2015/0172082 A1* | 6/2015 | Belveze | ............ | H03D 3/009 |
| | | | | 375/345 |

* cited by examiner

FIG.4F
FIG.4G
FIG.4H
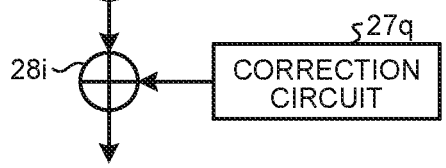
FIG.4I
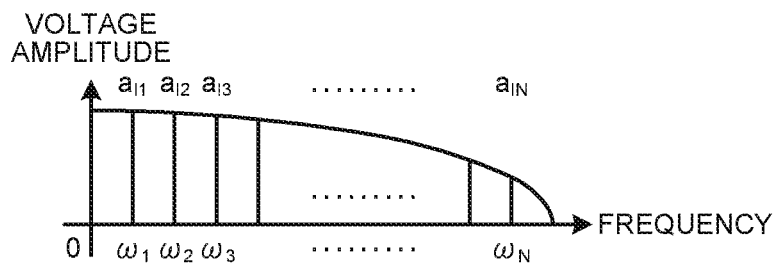

BEFORE CORRECTION

AFTER CORRECTION

| 3181a | 3181b | 3181c | 3181d |
|---|---|---|---|
| INPUT I-COMPONENT | INPUT Q-COMPONENT | OUTPUT I-COMPONENT | OUTPUT Q-COMPONENT |
| TIin1 | TQin1 | TIout1 | TQout1 |
| TIin2 | TQin2 | TIout2 | TQout2 |
| . | . | . | . |
| . | . | . | . |
| . | . | . | . |

3181

BEFORE CORRECTION

AFTER CORRECTION

BEFORE CORRECTION

AFTER CORRECTION

BEFORE CORRECTION

AFTER CORRECTION

FIG.16

$$RXBB_I = \underbrace{\frac{e^{jD_I(t)} + e^{-jD_I(t)}}{4}}_{\text{desired wave}} + \underbrace{\frac{\varepsilon\left(e^{jD_Q(t)} + e^{-jD_Q(t)}\right)}{4}}_{\text{noise}} \quad \cdots\text{(Formula 14)}$$

FIG.17

$$RXBB_Q = \underbrace{\frac{\varepsilon\left(-e^{jD_Q(t)} + e^{-jD_Q(t)}\right)}{4j}}_{\text{desired wave}} + \underbrace{\frac{-e^{jD_I(t)} + e^{-jD_I(t)}}{4j}}_{\text{noise}} \quad \cdots\text{(Formula 15)}$$

FIG.18

$$RXBB_I = \underbrace{\frac{1}{4}\sum_{i=1}^{N}\{a_{Ii}(c_{li} + c_{ui})\sin(\omega_i t)\}}_{\text{term relating to I component}} - \underbrace{\frac{1}{4}\sum_{i=1}^{N}\{a_{Qi}(c_{li} - c_{ui})\cos(\omega_i t)\}}_{\text{term relating to Q component}}$$

$\cdots$(Formula 17)

FIG.19

$$RXBB_Q = \frac{1}{4}\underbrace{\sum_{i=1}^{N}\{a_{Qi}(c_{li}+c_{ui})sin(\omega_i t)\}}_{\text{term relating to I component}} + \underbrace{\frac{1}{4}\sum_{i=1}^{N}\{a_{Ii}(c_{li}-c_{ui})cos(\omega_i t)\}}_{\text{term relating to Q component}}$$

···(Formula 18)

FIG.20

$$\frac{dRXBB_Q}{dt} = \frac{1}{4}\sum_{i=1}^{N}\{a_{Qi}\omega_i(c_{li}+c_{ui})cos(\omega_i t)\} - \frac{1}{4}\sum_{i=1}^{N}\{a_{Ii}\omega_i(c_{li}-c_{ui})sin(\omega_i t)\}$$

···(Formula 20)

FIG.21

$$\frac{dRXBB_I}{dt} = \frac{1}{4}\sum_{i=1}^{N}\{a_{Ii}\omega_i(c_{li}+c_{ui})cos(\omega_i t)\} + \frac{1}{4}\sum_{i=1}^{N}\{a_{Qi}\omega_i(c_{li}-c_{ui})sin(\omega_i t)\}$$

···(Formula 23)

RECEPTION APPARATUS, TRANSMISSION APPARATUS, AND COMMUNICATION SYSTEM

CROSS-REFERENCE TO RELATED APPLICATIONS

This application is based upon and claims the benefit of priority from Japanese Patent Application No. 2017-179213, filed on Sep. 19, 2017; the entire contents of which are incorporated herein by reference.

FIELD

Embodiments described herein relate generally to a reception apparatus, a transmission apparatus, and a communication system.

BACKGROUND

In a communication system, there is a case where a transmission apparatus and a reception apparatus are connected via a wired communication channel to perform wired communication. In this case, it is desired to accelerate speed of the wired communication.

BRIEF DESCRIPTION OF THE DRAWINGS

FIG. 4A to FIG. 4I are diagrams illustrating a communication procedure of a signal (I component) in the first embodiment;

FIG. 16 is a diagram illustrating Formula 14;

FIG. 17 is a diagram illustrating Formula 15;

FIG. 18 is a diagram illustrating Formula 17;

FIG. 19 is a diagram illustrating Formula 18;

FIG. 20 is a diagram illustrating Formula 20; and

FIG. 21 is a diagram illustrating Formula 23.

DETAILED DESCRIPTION

In general, according to one embodiment, there is provided a reception apparatus including a reception node, a first frequency conversion circuit, a second frequency conversion circuit, a first adder circuit, a second adder circuit, a first correction circuit, and a second correction circuit. The reception node is capable of being connected to a wired communication channel. The first frequency conversion circuit is electrically connected to the reception node. The second frequency conversion circuit is electrically connected to the reception node. The first adder circuit is electrically connected to the first frequency conversion circuit. The second adder circuit is electrically connected to the second frequency conversion circuit. The first correction circuit is electrically connected between the first frequency conversion circuit and the second adder circuit. The second correction circuit is electrically connected between the second frequency conversion circuit and the first adder circuit. The first correction circuit includes a reverse phase amplifier and a first capacitative element. The second correction circuit includes a positive phase amplifier and a second capacitative element.

Exemplary embodiments of a communication system will be explained below in detail with reference to the accompanying drawings. The present invention is not limited to the following embodiments.

First Embodiment

Figure 1:
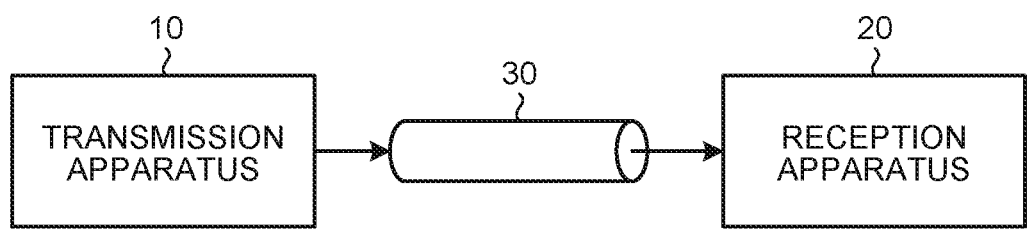
FIG. 1 is a diagram illustrating a configuration of a communication system according to a first embodiment.
Figure 1:

A communication system 1 according to a first embodiment is described with reference to FIG. 1. FIG. 1 is a diagram illustrating a configuration of the communication system 1.

The communication system 1 includes a transmission apparatus 10, a reception apparatus 20, and a wired communication channel 30. The transmission apparatus 10 and the reception apparatus 20 are communicably connected to each other via the wired communication channel 30. The transmission apparatus 10 transmits certain data to the reception apparatus 20 via the wired communication channel 30. The reception apparatus 20 receives the data from the transmission apparatus 10 via the wired communication channel 30.

With an increase of capacity of data from the transmission apparatus 10 to the reception apparatus 20 handled by wired communication, a high communication speed (data transfer rate) of the wired communication has been required. As a modulation method of data to be used for the wired communication, if quadrature modulation (such as QPSK) can be applied instead of amplitude modulation (such as ASK, BPSK), two signals can be multiplexed and transmitted by two carrier waves of the same frequency. Therefore, the high communication speed of the wired communication can be expected. If the quadrature modulation is used as the data modulation method of the wired communication, use efficiency of frequency (band) can be increased more than a case of using amplitude modulation; however, expansion of a signal band may become difficult.

For example, when amplitude modulation. (for example, ASK) is used as the data modulation method of the wired communication, the transmission apparatus 10 performs frequency conversion of a baseband signal TXBB expressed by Formula 1 with a local signal TXLO expressed by Formula 2, and transmits the frequency-converted signal to the reception apparatus 20 via the wired communication channel 30.

$$TXBB = \frac{e^{jD(t)} + e^{-jD(t)}}{2} \quad \text{(Formula 1)}$$
$$D(t) \in \{0, \pi\}$$

$$TXLO = \frac{e^{j\omega_{LO}t} + e^{-j\omega_{LO}t}}{2} \quad \text{(Formula 2)}$$

Figure 2A:
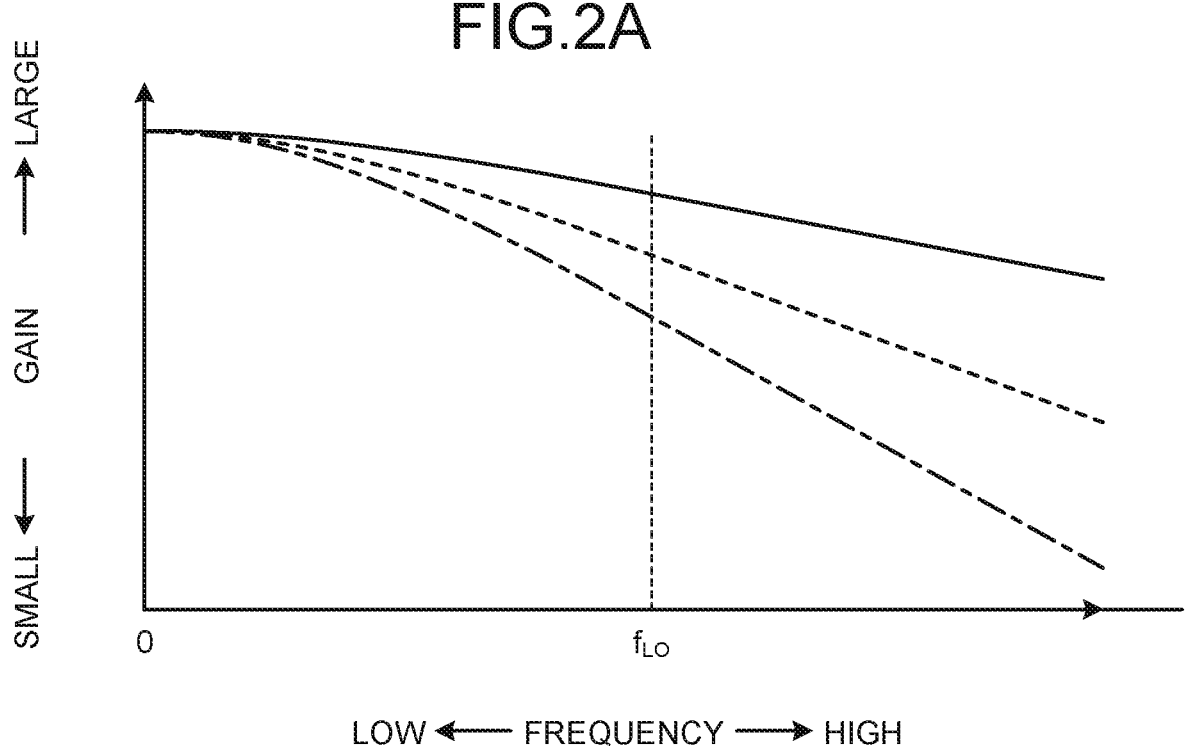
FIG. 2A and FIG. 2B are diagrams illustrating frequency characteristics in a wired communication channel in the first embodiment.
Figure 2B:
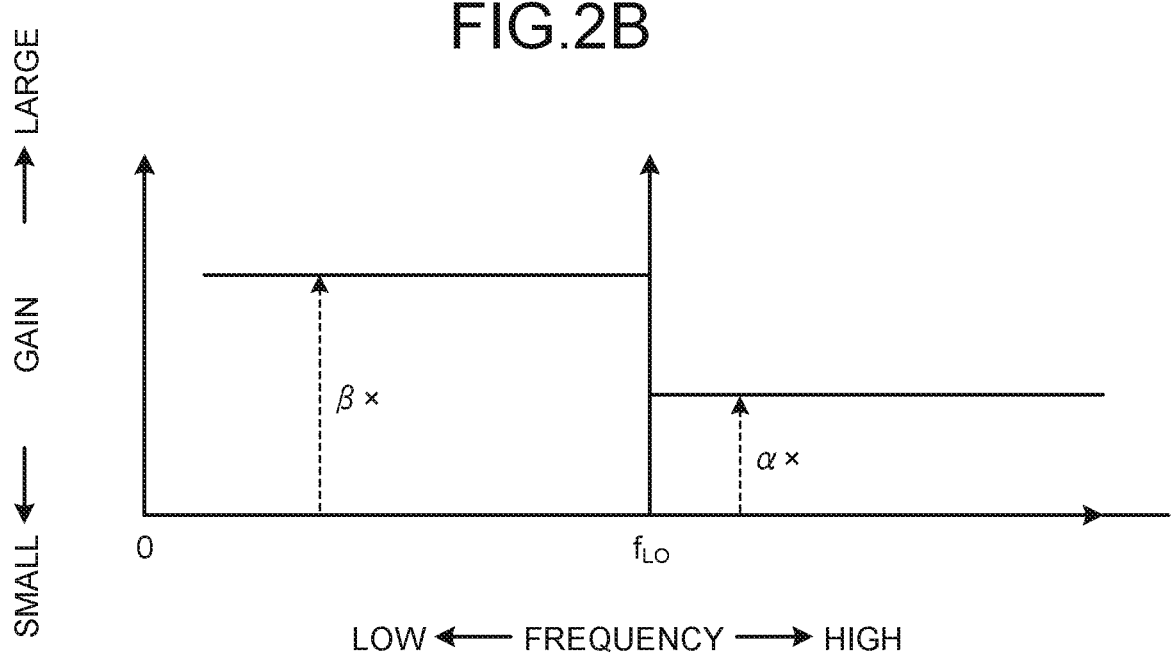

At this time, frequency characteristics of gain in the wired communication channel 30 are as illustrated in FIG. 2A and FIG. 2B. The wired communication channel 30 can include a primary channel, a secondary channel, and a tertiary channel. FIG. 2A is a diagram illustrating the frequency characteristics of the gain in the wired communication channel 30. In FIG. 2A, the frequency characteristics of the primary channel are indicated by a solid line, the frequency characteristics of the secondary channel are indicated by a broken line, and the frequency characteristics of the tertiary channel are indicated by a dot-and-dash line. FIG. 2B is a diagram approximately illustrating the frequency characteristics of the gain in FIG. 2A. As illustrated in FIG. 2A, the wired communication channel 30 has asymmetric frequency characteristics of the gain on the right and left sides of a frequency $f_{LO}$ of a local signal. As seen approximately, as illustrated in FIG. 2B, it can be regarded that the wired communication channel 30 indicates a gain β on the left side (on a low frequency side) of the frequency $f_{LO}$, whereas the wired communication channel 30 indicates a gain α on the right side (on a high frequency side) of the frequency $f_{LO}$.

The reception apparatus 20 performs frequency conversion of the signal received via the wired communication channel 30 with a local signal RXLO expressed by Formula 3 to acquire a baseband signal RXBB expressed by Formula 4.

$$RXLO = \frac{e^{j\omega_{LO}t} + e^{-j\omega_{LO}t}}{2} \quad \text{(Formula 3)}$$

$$RXBB = \frac{(\alpha + \beta)(e^{jD(t)} + e^{-jD(t)})}{8} \quad \text{(Formula 4)}$$

The baseband signal RXBB includes factors α and β that indicate frequency asymmetry (gain deviation) of the wired communication channel 30. The factors α and β indicating the frequency asymmetry of the wired communication channel 30 can be cancelled by equalizing the baseband signal RXBB.

For example, in Formula 4, if it is assumed that α=1−ε and β=1+ε are established, Formula 4 is deformed as expressed by the following Formula 5, and the factor indicating the frequency asymmetry of the wired communication channel 30 can be cancelled.

$$RXBB = \frac{e^{jD(t)} + e^{-jD(t)}}{4} \quad \text{(Formula 5)}$$

Figure 3:
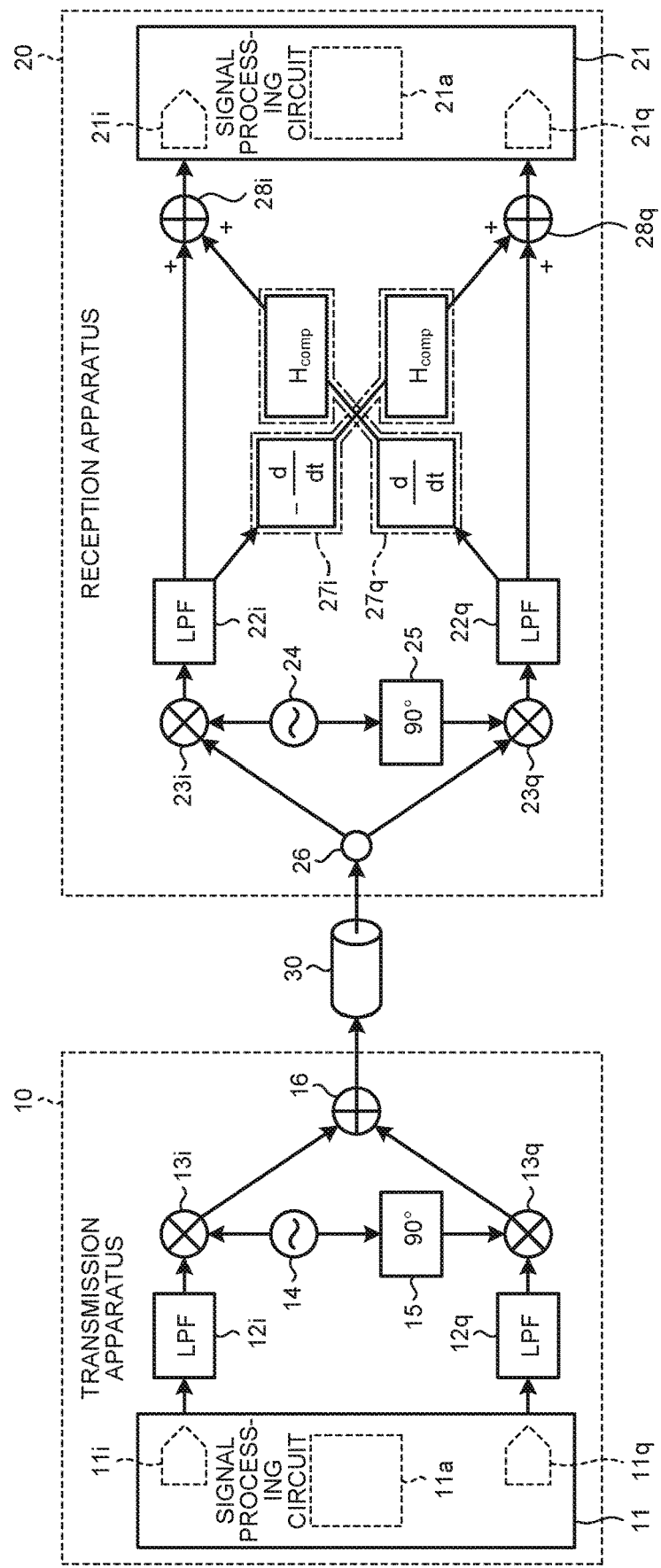
FIG. 3 is a block diagram illustrating a configuration of a transmission apparatus and a reception apparatus in the first embodiment.

Meanwhile, when quadrature modulation (for example, QPSK) is used as the data modulation method of the wired communication, the transmission apparatus 10 is configured, for example, as illustrated in FIG. 3. FIG. 3 is a block diagram illustrating a configuration of the transmission apparatus 10 and the reception apparatus 20. The transmission apparatus 10 is configured so as to perform quadrature modulation to a signal in an analog manner. The transmission apparatus 10 includes a signal processing circuit 11, low-pass filters (LPF) 12i and 12q, frequency conversion circuits 13i and 13q, an oscillator 14, a 90° phase shifter 15, and an adder 16. The signal processing circuit 11 includes a processing unit 11a and DA conversion units 11i and 11q. The processing unit 11a performs digital signal processing of data to be transmitted, and respectively supplies the processed digital signal to the DA conversion units 11i and 11q.

The DA conversion unit 11i performs DA conversion of a digital signal to generate a baseband signal $TXBB_I$ (analog signal) for an I component (in-phase component) as expressed by Formula 6, and supplies the baseband signal $TXBB_I$ to the LPF 12i.

$$TXBB_I = \frac{e^{jD_I(t)} + e^{-jD_I(t)}}{2} \quad \text{(Formula 6)}$$
$$D_I(t) \in \{0, \pi\}$$

The LPF 12i removes high-frequency noise in the baseband signal $TXBB_I$ for the I component and supplies the baseband signal $TXBB_I$ to the frequency conversion circuit 13i. The frequency conversion circuit 13i receives a local signal TXLO as expressed by Formula 7 from the oscillator 14, and performs frequency conversion of the I-component baseband signal $TXBB_I$ with the local signal $TXLO_I$ to generate an I-component signal.

$$TXLO_I = \frac{e^{j\omega_{LO}t} + e^{-j\omega_{LO}t}}{2} \quad \text{(Formula 7)}$$

Similarly, the DA conversion unit 11q performs DA conversion of a digital signal to generate a Q-component (quadrature component) baseband signal $TXBB_Q$ as expressed by Formula 8, and supplies the baseband signal $TXBB_Q$ to the LPF 12q.

$$TXBB_Q = \frac{-e^{jD_Q(t)} + e^{-jD_Q(t)}}{2j} \quad \text{(Formula 8)}$$
$$D_Q(t) \in \left\{\frac{1}{2}\pi, \frac{3}{2}\pi\right\}$$

The LPF 12q removes high-frequency noise in the Q-component baseband signal $TXBB_Q$ and supplies the baseband signal $TXBB_Q$ to the frequency conversion circuit 13q. The frequency conversion circuit 13q receives a local signal $TXLO_Q$ as expressed by Formula 9 from the oscillator 14 via the 90° phase shifter 15, and performs frequency conversion of the Q-component baseband signal $TXBB_Q$ with the local signal $TXLO_Q$ to generate a Q-component signal.

$$TXLO_Q = \frac{-e^{j\omega_{LO}t} + e^{-j\omega_{LO}t}}{2j} \quad \text{(Formula 9)}$$

That is, the phase of the local signal TXLO used in the frequency conversion circuit 13*i* and the phase of the local signal $TXLO_Q$ used in the frequency conversion circuit 13*q* are shifted by 90° from each other. Therefore, the I-component signal and the Q-component signal after the frequency conversion are signals applied with quadrature modulation. The adder (transmission node) 16 generates a communication signal by adding the I-component signal and the Q-component signal, and transmits the generated communication signal to the reception apparatus 20 via the wired communication channel 30.

The reception apparatus 20 receives the communication signal from the transmission apparatus 10 via the wired communication channel 30. The reception apparatus 20 is configured to perform quadrature modulation to the signal (communication signal) in an analog manner. The reception apparatus 20 includes a divider 26, an oscillator 24, a 90° phase shifter 25, frequency conversion circuits 23*i* and 23*q*, low-pass filters (LPF) 22*i* and 22*q*, and a signal processing circuit 21.

The divider (reception node) 26 receives a communication signal from the transmission apparatus 10 via the wired communication channel 30, divides the received communication signal into two signals for the I component and the Q component, and supplies one (I-component signal) of the two signals to the frequency conversion circuit 23*i*. The frequency conversion circuit 23*i* receives a local signal $RXLO_I$ expressed by Formula 10 from the oscillator 24.

$$RXLO_I = \frac{e^{j\omega_{LO}t} + e^{-j\omega_{LO}t}}{2} \quad \text{(Formula 10)}$$

The frequency conversion circuit 23*i* performs frequency conversion of the I-component signal with the local signal $RXLO_I$ to generate a baseband signal $RXBB_I$ expressed by Formula 11, and supplies the baseband signal $RXBB_I$ to the LPF 22*i*. Equivalently, the frequency conversion circuit 23*i* extracts the I-component baseband signal $RXBB_I$ from the signal received by the divider 26.

$$RXBB_I = \underbrace{\frac{(\beta + \alpha)(e^{jD_I(t)} + e^{-jD_I(t)})}{8}}_{\text{term relating to } I \text{ component}} + \quad \text{(Formula 11)}$$

$$\underbrace{\frac{(\beta - \alpha)(e^{jD_Q(t)} + e^{-jD_Q(t)})}{8}}_{\text{term relating to } Q \text{ component}}$$

The LPF 22*i* removes high-frequency noise in the I-component baseband signal $RXBB_I$.

The divider 26 supplies the other one (Q-component signal) of the two signals to the frequency conversion circuit 23*q*. The frequency conversion circuit 23*q* receives a local signal $RXLO_Q$ expressed by Formula 12 from the oscillator 24 via the 90° phase shifter 25.

$$RXLO_Q = \frac{-e^{j\omega_{LO}t} + e^{-j\omega_{LO}t}}{2j} \quad \text{(Formula 12)}$$

The frequency conversion circuit 23*q* performs frequency conversion of the Q-component signal with the local signal $RXLO_Q$ to acquire a baseband signal $RXBB_Q$ expressed by Formula 13. Equivalently, the frequency conversion circuit 23*q* extracts the Q-component baseband signal $RXBB_Q$ from the signal received by the divider 26.

$$RXBB_Q = \underbrace{\frac{(\beta - \alpha)(-e^{jD_I(t)} + e^{-jD_I(t)})}{8j}}_{\text{term relating to } I \text{ component}} + \quad \text{(Formula 13)}$$

$$\underbrace{\frac{(\beta + \alpha)(-e^{jD_Q(t)} + e^{-jD_Q(t)})}{8j}}_{\text{term relating to } Q \text{ component}}$$

The LPF 22*q* removes high-frequency noise in the Q-component baseband signal $RXBB_Q$.

The signal processing circuit 21 includes a processing unit 21*a* and AD conversion units 21*i* and 21*q*. The AD conversion unit 21*i* performs AD conversion with respect to the signal supplied from the LPF 22*i* to generate a digital signal, and supplies the digital signal to the processing unit 21*a*. The AD conversion unit 21*q* performs AD conversion with respect to the signal supplied from the LPF 22*q* to generate a digital signal, and supplies the digital signal to the processing unit 21*a*. The processing unit 21*a* performs digital signal processing with respect to the respective digital signals for the I component and the Q component. The digital signal processing also includes, for example, equalizing processing of the digital signal.

The baseband signal $RXBB_I$ expressed by Formula 11 includes a term relating to the I component and a term relating to the Q component, and each of the respective terms includes factors α and β indicating the frequency asymmetry (gain deviation) of the wired communication channel 30. Regarding the factors α and β indicating the frequency asymmetry of the wired communication channel 30, if the baseband signal $RXBB_I$ is equalized, the factors α and β can be cancelled in the term relating to the I component, but may remain without being cancelled in the term relating to the Q component.

For example, in Formula 11, if α=1−ε and β=1+ε are established, Formula 11 is deformed as expressed by the following Formula 14 depicted in FIG. 16, and the factor indicating the frequency asymmetry of the wired communication channel 30 may remain without being cancelled.

As expressed by Formula 14, in the baseband signal $RXBB_I$ after equalization, the term relating to the I component in which α and β have been cancelled becomes a component having a desired wave, whereas the term relating to the Q component in which α and β may remain without being cancelled may become noise.

Similarly, the baseband signal $RXBB_Q$ expressed by Formula 13 includes the term relating to the I component and the term relating to the Q component, and each of the respective terms includes factors α and β indicating the frequency asymmetry (gain deviation) of the wired communication channel 30. Regarding the factors α and β indicating the frequency asymmetry of the wired communication channel 30, if the baseband signal $RXBB_Q$ is equalized, the factors α and β can be cancelled in the term relating to the Q component, but may remain without being cancelled in the term relating to the I component.

For example, in Formula 13, if α=1−ε and β=1+ε are established, Formula 13 is deformed as expressed by the following Formula 15 depicted in FIG. 17, and the factor indicating the frequency asymmetry of the wired communication channel 30 may remain without being cancelled.

As expressed by Formula 15, in the baseband signal $RXBB_Q$ after equalization, the term relating to the Q component in which $\alpha$ and $\beta$ have been cancelled becomes a component having a desired wave, whereas the term relating to the I component in which $\alpha$ and $\beta$ may remain without being cancelled may become noise.

That is, noise expressed by Formula 14 can be regarded as noise resulting from interference by the Q component with respect to the I-component baseband signal $RXBB_I$, and noise expressed by Formula 15 can be regarded as noise resulting from interference by the I component with respect to the Q-component baseband signal $RXBB_Q$. In the present specification, the interference noise is referred to as "IQ interference noise" in order to express that the noise results from interference between the I component and the Q component.

When quadrature modulation (QPSK) is used as the data modulation method of the wireless communication, because the used frequency band is restricted by the wireless communication standard, the IQ interference noise is so small that it can be ignored, or remains at a level where it can be removed easily by digital signal processing.

When quadrature modulation (QPSK) is used as the data modulation method of the wired communication, a frequency band wider than that in wireless communication (for example, a band with a speed higher than wireless communication) can be used. However, as expressed by Formula 14 and Formula 15, the IQ interference noise is generated greatly at the time of using a wide band, and the IQ interference noise may exceed a level where it can be removed by digital signal processing. To satisfy the demand for high communication speed (data transfer rate) of the wired communication, it is desired to remove the IQ interference noise at the time of using a wide band.

Therefore, in the present embodiment, removal of the IQ interference noise at the time of using a wide band is attempted by configuring the reception apparatus 20 so as to compensate the interference noise (IQ interference noise) between the I component and the Q component in an analog manner.

Specifically, the reception apparatus 20 further includes, as illustrated in FIG. 3, a correction circuit 27*i*, a correction circuit 27*q*, an adder circuit 28*i*, and an adder circuit 28*q*. FIG. 3 is a block diagram illustrating a functional configuration of the reception apparatus 20.

The correction circuit 27*q* is electrically inserted between an output side of the frequency conversion circuit 23*q* and the adder circuit 28*i*, and is electrically inserted between the LPF 22*q* and the adder circuit 28*i*.

The correction circuit 27*i* is electrically inserted between an output side of the frequency conversion circuit 23*i* and the adder circuit 28*q*, and is electrically inserted between the LPF 22*i* and the adder circuit 28*q*.

The adder circuit 28*i* is electrically connected to the output side of the frequency conversion circuit 23*i* and is electrically inserted between the LPF 22*i* and the signal processing circuit 21.

The adder circuit 28*q* is electrically connected to the output side of the frequency conversion circuit 23*q* and is electrically inserted between the LPF 22*q* and the signal processing circuit 21.

Next, operations of the correction circuit 27*q* and the adder circuit 28*i* in a communication procedure of the (I component) signal are described with reference to FIG. 4A to FIG. 4I. FIG. 4A to FIG. 4I are diagrams illustrating a communication procedure of the (I component) signal.

Figure 4A:
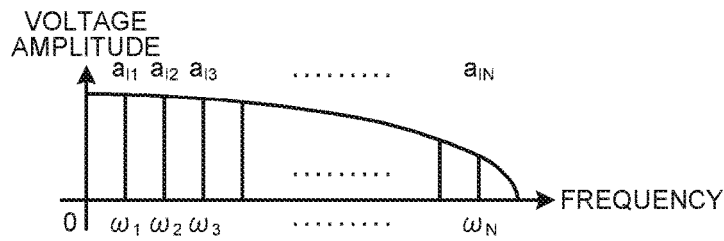
Figure 4B:
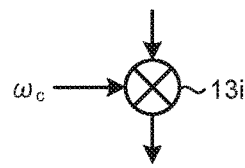
Figure 4C:
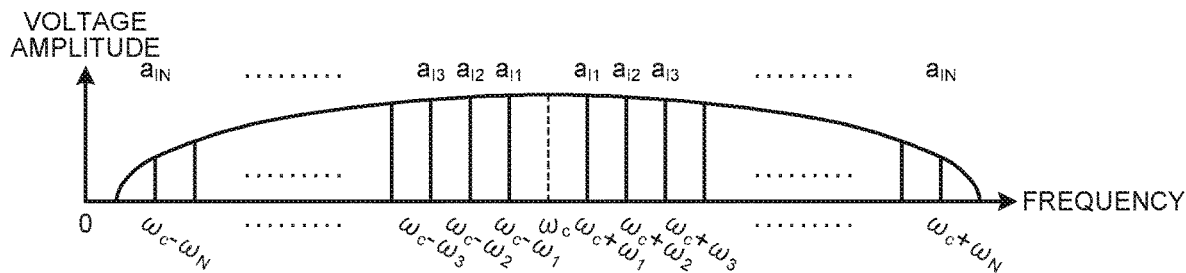
Figure 4D:
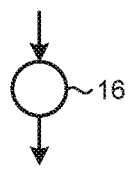
Figure 4E:
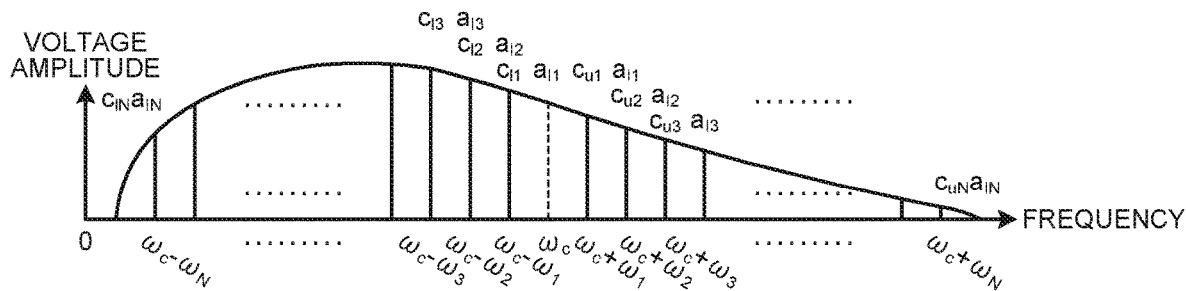

For example, FIG. 4A illustrates a relation between the frequency and voltage amplitude regarding the I-component baseband signal $TXBB_I$ to be generated by the transmission apparatus 10. In FIG. 4A, voltage amplitudes $a_{I1}$ to $a_{IN}$ for each of frequencies $\omega_1$ to $\omega_N$. In the frequency conversion circuit 13*i* of the transmission apparatus 10, if the baseband signal $TXBB_I$ is frequency-converted by the local signal $TXLO_I$ of a frequency $\omega_c$ illustrated in FIG. 4B, a generated I-component signal is as that illustrated in FIG. 4C. The frequency $\omega_c$ is a frequency (carrier frequency) corresponding to the frequency $f_{LO}$ in FIG. 2A and FIG. 2B. In the I-component signal illustrated in FIG. 4C, the baseband signal TXBB-illustrated in FIG. 4A is shifted as a whole by the frequency $\omega_c$, and has a waveform folded back centering on the frequency $\omega_c$. That is, when the relation between the frequency and the voltage amplitude is taken into consideration, the waveform has approximately a line-symmetric shape on the right and left of the frequency $\omega_c$. The I-component signal illustrated in FIG. 4C is affected by the frequency asymmetry of the wired communication channel 30 in a process in which the I-component signal is transmitted from the adder 16 of the transmission apparatus 10 to the divider 26 of the reception apparatus 20 via the wired communication channel 30. The waveform indicating the relation between the frequency and the voltage amplitude of the I component becomes asymmetric on the right and left of the frequency $\omega_c$ as illustrated in FIG. 4E. In FIG. 4E, the asymmetry is illustrated by a difference between coefficients $c_{l1}$ to $c_{lN}$ on the left side and coefficients $c_{u1}$ to $c_{uN}$ on the right side with respect to the frequency $\omega_c$. If the I-component signal is frequency-converted by the local $RXLO_I$ of the frequency $\omega_c$ illustrated in FIG. 4G by the frequency conversion circuit 23*i*, the baseband signal RXBB; to be extracted becomes a signal including factors (coefficients $c_{l1}$ to $c_{lN}$, $c_{u1}$ to $c_{uN}$) indicating the asymmetry as illustrated by Formula 16.

$$RXBB_I = \qquad\qquad\qquad\text{(Formula 16)}$$
$$\frac{1}{4}\{a_{I1}(c_{l1}+c_{u1})\sin(\omega_1 t) + a_{I2}(c_{l2}+c_{u2})\sin(\omega_2 t) + \Lambda +$$
$$a_{IN}(c_{lN}+c_{uN})\sin(\omega_N t)\} -$$
$$\frac{1}{4}\{a_{Q1}(c_{l1}-c_{u1})\cos(\omega_1 t) + a_{Q2}(c_{l2}-c_{u2})\cos(\omega_2 t) +$$
$$\Lambda + a_{QN}(c_{lN}-c_{uN})\cos(\omega_N t)\}$$

Formula 16 can be expressed as in Formula 17 depicted in FIG. 18, when collected by using $\Sigma$.

As expressed by Formula 17, in the I-component baseband signal $RXBB_I$, the term relating to the I component becomes a component having a desired wave, whereas the term relating to the Q component illustrated by being enclosed by a broken line may become noise.

Similarly, the Q-component baseband signal $RXBB_Q$ can be expressed as Formula 18 depicted in FIG. 19.

As expressed by Formula 18, in the Q-component baseband signal $RXBB_Q$, the term relating to the Q component becomes a component having a desired wave, whereas the term relating to the I component illustrated by being enclosed by a broken line may become noise.

In each of the I-component signal and the Q-component signal, an S/N ratio can be deteriorated greatly as expressed by Formula 19.

$$S/N = \frac{|c_{li} + c_{ui}|}{|c_{li} - c_{ui}|} \quad \text{(Formula 19)}$$

Here, when the term relating to the Q component in Formula 17 and the term relating to the Q component in Formula 18 are compared with each other, it is understood that coefficients are similar to each other except for the difference of sin and con. Focusing on this point, in the present embodiment, in the correction circuit 27$q$ illustrated in FIG. 3 and FIG. 4H, as expressed by Formula 20 depicted in FIG. 20, the sign is inverted and a compensation filter $H_{comp}$ expressed by Formula 21 is multiplied to a result $dRXBB_Q/dt$ of differentiating the Q-component baseband signal $RXBB_Q$.

$$H_{comp} = \frac{c_{li} - c_{ui}}{\omega_i(c_{li} + c_{ui})} \quad \text{(Formula 21)}$$

If a multiplication result thereof is added to the I-component baseband signal $RXBB_I$ expressed by Formula 17 by the adder circuit 28$i$, noise can be cancelled as expressed by Formula 22.

$$RXBB'_I = -\frac{1}{4}\sum_{i=1}^{N}\left\{a_{Ii}\frac{(c_{li} - c_{ui})^2}{(c_{li} + c_{ui})}\sin(\omega_i t)\right\} + \quad \text{(Formula 22)}$$

$$\frac{1}{4}\sum_{i=1}^{N}\{a_{Ii}(c_{li} + c_{ui})\sin(\omega_i t)\}$$

Accordingly, as illustrated in FIG. 4I, the I-component baseband signal having the same waveform as that on the transmission side of the transmission apparatus can be acquired. The adder circuit 28$i$ supplies the addition result (I-component baseband signal) to the signal processing circuit 21.

Similarly, when the term relating to the I component in Formula 17 and the term relating to the I component in Formula 18 are compared with each other, it is understood that coefficients are similar to each other except for the difference of sin and con. Focusing on this point, in the present embodiment, in the correction circuit 27$i$ illustrated in FIG. 3 and FIG. 4H, the compensation filter $H_{comp}$ expressed by Formula 21 described above is multiplied to a result $dRXBB_I/dt$ of differentiating the I-component baseband signal $RXBB_I$ as expressed by Formula 23 depicted in FIG. 21.

If a multiplication result thereof is added to the Q-component baseband signal $RXBB_Q$ expressed by Formula 18 by the adder circuit 28$q$, noise can be cancelled as expressed by Formula 24.

$$dRXBB'_Q = -\frac{1}{4}\sum_{i=1}^{N}\left\{a_{Qi}\frac{(c_{li} - c_{ui})^2}{(c_{li} + c_{ui})}\sin(\omega_i t)\right\} + \quad \text{(Formula 24)}$$

$$\frac{1}{4}\sum_{i=1}^{N}\{a_{Qi}(c_{li} + c_{ui})\sin(\omega_i t)\}$$

Accordingly, the Q-component baseband signal having the same waveform as that on the transmission side can be acquired. The adder circuit 28$q$ supplies the addition result (Q-component baseband signal) to the signal processing circuit 21.

Figure 5A:
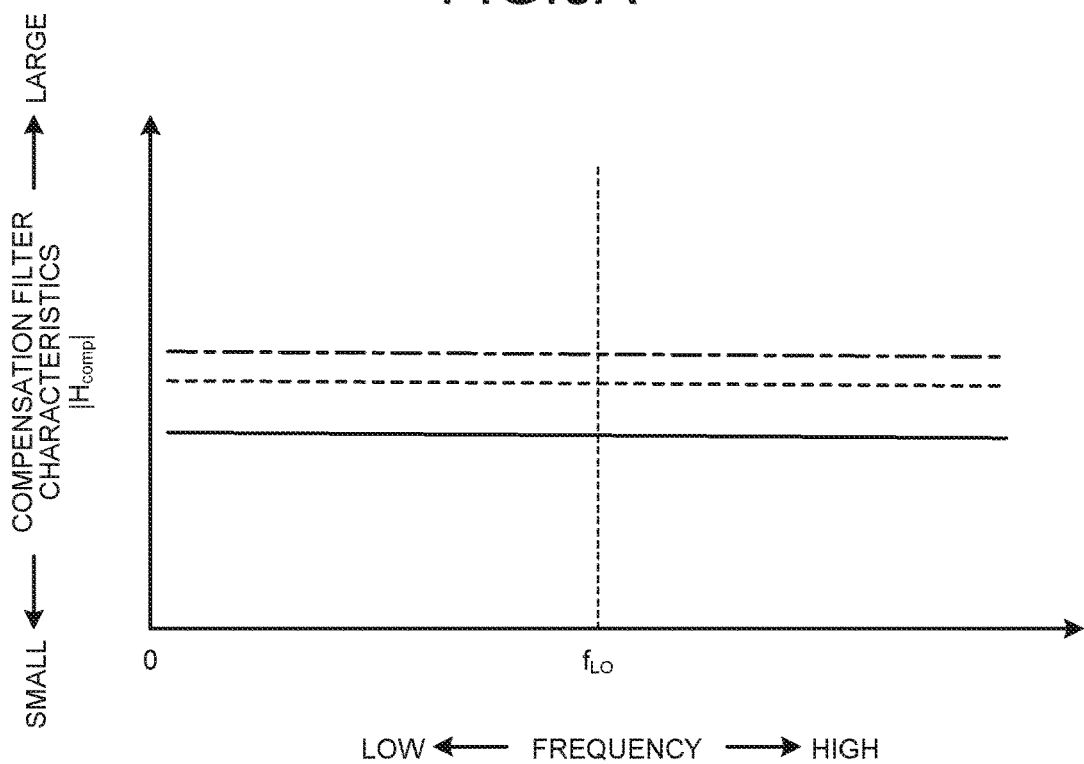
FIG. 5A and FIG. 5B are diagrams illustrating compensation filter characteristic and a compensation loss of correction circuits in the first embodiment.
Figure 5B:
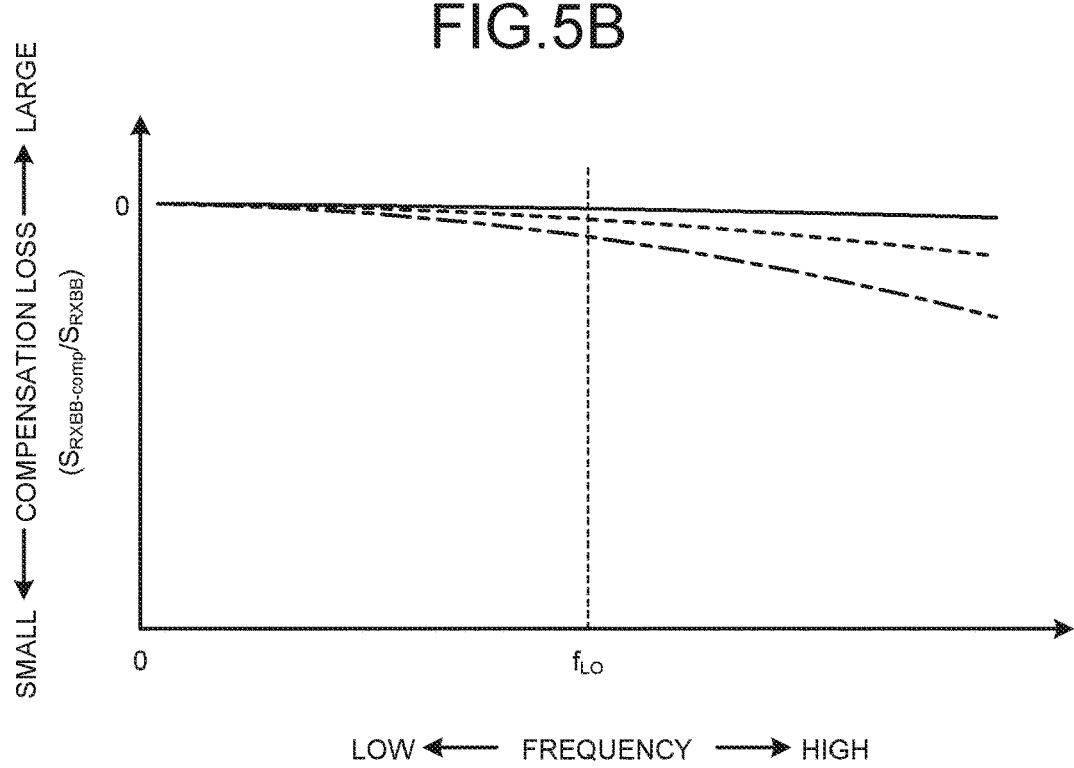

It should be noted that, as illustrated in FIG. 5A, the compensation filter $H_{comp}$ expressed by Formula 21 indicates approximately flat compensation filter characteristics and analog implementation is easy. FIG. 5A is a diagram illustrating the compensation filter characteristics of the correction circuits 27$i$ and 27$q$, in which the compensation filter characteristics of the primary channel are indicated by a solid line, the compensation filter characteristics of the secondary channel are indicated by a broken line, and the compensation filter characteristics of the tertiary channel are indicated by a dot-and-dash line. A compensation loss expressing a loss of a main signal by the compensation filter $H_{comp}$ can be made approximately zero in a wide frequency band, as illustrated in FIG. 5B. FIG. 5B is a diagram illustrating a compensation loss of the correction circuits 27$i$ and 27$q$, in which the compensation loss of the primary channel is indicated by a solid line, the compensation loss of the secondary channel is indicated by a broken line, and the compensation loss of the tertiary channel is indicated by a dot-and-dash line.

Figure 6:
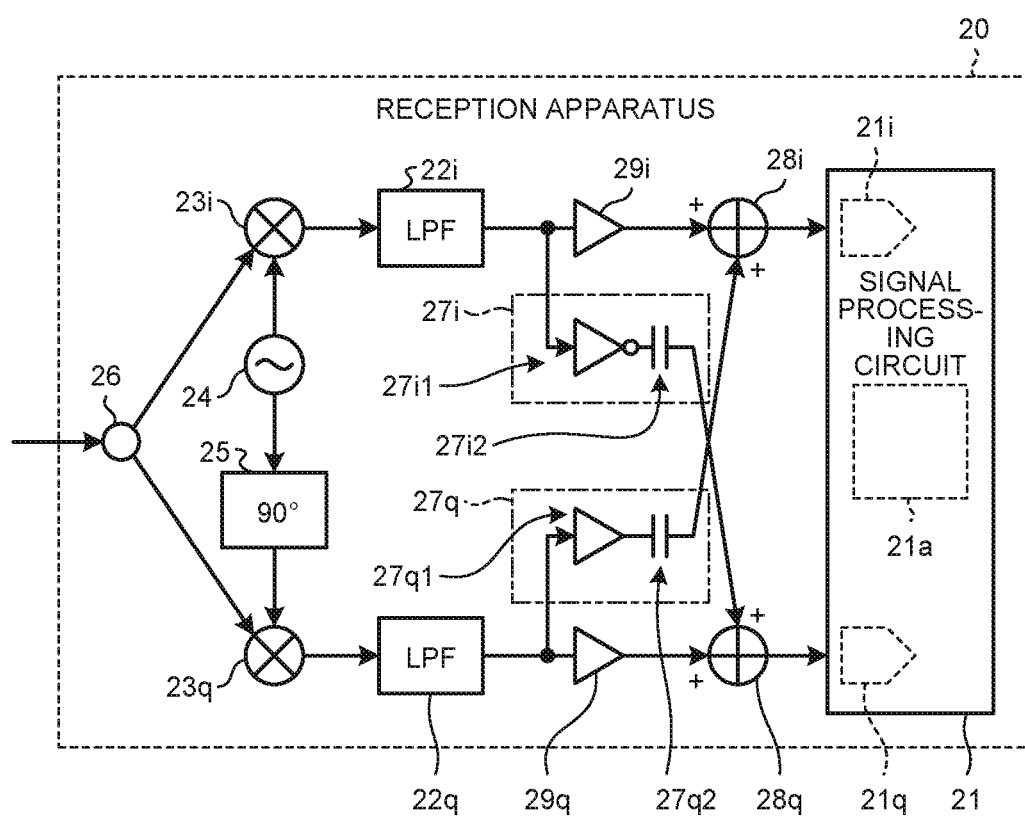
FIG. 6 is a circuit diagram illustrating configuration of the reception apparatus in the first embodiment.

If the function of compensating the IQ interference noise is configured by an analog circuit, for example, it becomes a configuration illustrated in FIG. 6. FIG. 6 is a circuit diagram illustrating a configuration of the reception apparatus 20.

The correction circuit 27$i$ includes a reverse phase amplifier 27$i$1 and a capacitative element 27$i$2. An input side of the reverse phase amplifier 27$i$1 is connected to an output node of the LPF 22$i$, and an output side thereof is connected to one end of the capacitative element 27$i$2. The capacitative element 27$i$2 is connected to an output node of the reverse phase amplifier 27$i$1 at one end, and the other end thereof is connected the adder circuit 28$q$. The gain of the reverse phase amplifier 27$i$1 and a capacitance value of the capacitative element 27$i$2 can be experimentally adjusted in advance so as to perform calculation to obtain $dRXBB_Q/dt$ in Formula 20 by differentiating $RXBB_Q$ in Formula 18 and calculation to multiply $dRXBB_Q/dt$ in Formula 20 by $H_{comp}$ in Formula 21.

It should be noted that, with the provision of the reverse phase amplifier 27$i$ in the correction circuit 27$i$, in order to balance the circuit, a positive phase amplifier 29$i$ having equivalent characteristics to the one obtained by reversing the sign of the gain of the reverse phase amplifier 27$i$1 can be electrically inserted between the LPF 22$i$ and the adder circuit 28$i$.

The correction circuit 27$q$ includes a positive phase amplifier 27$q$1 and a capacitative element 27$q$2. An input side of the positive phase amplifier 27$q$1 is connected to an output node of the LPF 22$q$, and an output side thereof is connected to one end of the capacitative element 27$q$2. The capacitative element 27$q$2 is connected to an output node of the positive phase amplifier 27$q$1 at one end, and the other end thereof is connected the adder circuit 28$i$. The gain of the positive phase amplifier 27$q$1 and a capacitance value of the capacitative element 27$q$2 can be experimentally adjusted in advance so as to perform calculation to obtain $dRXBB_I/dt$ in Formula 23 by differentiating $RXBB_I$ in Formula 17 and calculation to multiply $dRXBB_I/dt$ in Formula 23 by $H_{comp}$ in Formula 21.

It should be noted that, with the provision of the positive phase amplifier 27$q$1 in the correction circuit 27$q$, in order to balance the circuit, a positive phase amplifier 29$q$ having equivalent characteristics to the positive phase amplifier 27$q$1 can be electrically inserted between the LPF 22$q$ and the adder circuit 28$q$.

As described above, according to the first embodiment, in the reception apparatus 20, the correction circuit 27$i$ including the reverse phase amplifier 27$i$1 and the capacitative element 27$i$2 is electrically inserted between the output side of the frequency conversion circuit 23$q$ and the adder circuit 28$i$. Further, the correction circuit 27$q$ including the positive phase amplifier 27$q$1 and the capacitative element 27$q$2 is electrically inserted between the output side of the frequency conversion circuit 23$i$ and the adder circuit 28$q$. At this time, the gain of the reverse phase amplifier 27$i$1 and the capacitance value of the capacitative element 27$i$2 can be experimentally adjusted in advance so as to perform calculation to obtain $dRXBB_I/dt$ in Formula 23 by differentiating $RXBB_I$ in Formula 17 and invert the sign and calculation to multiply $dRXBB_I/dt$ in Formula 23 by $H_{comp}$ in Formula 21. Further, the gain of the positive phase amplifier 27$q$1 and the capacitance value of the capacitative element 27$q$2 can be experimentally adjusted in advance so as to perform calculation to obtain $dRXBB_Q/dt$ in Formula 20 by differentiating $RXBB_Q$ in Formula 18 and calculation to multiply $dRXBB_Q/dt$ in Formula 20 by $H_{comp}$ in Formula 21. Accordingly, the IQ interference noise can be compensated in an analog manner and the IQ interference noise at the time of using a wide band can be removed.

Figure 7A:
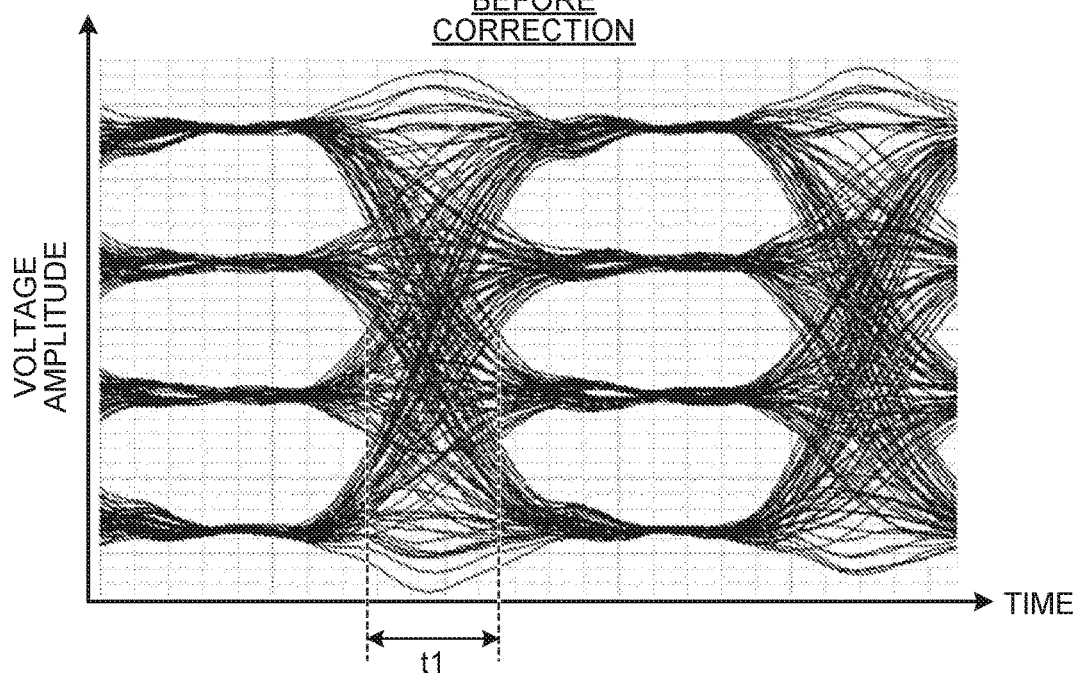
FIG. 7A and FIG. 7B are diagrams illustrating operations of the communication system in the first embodiment.
Figure 7A:
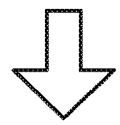
Figure 7B:
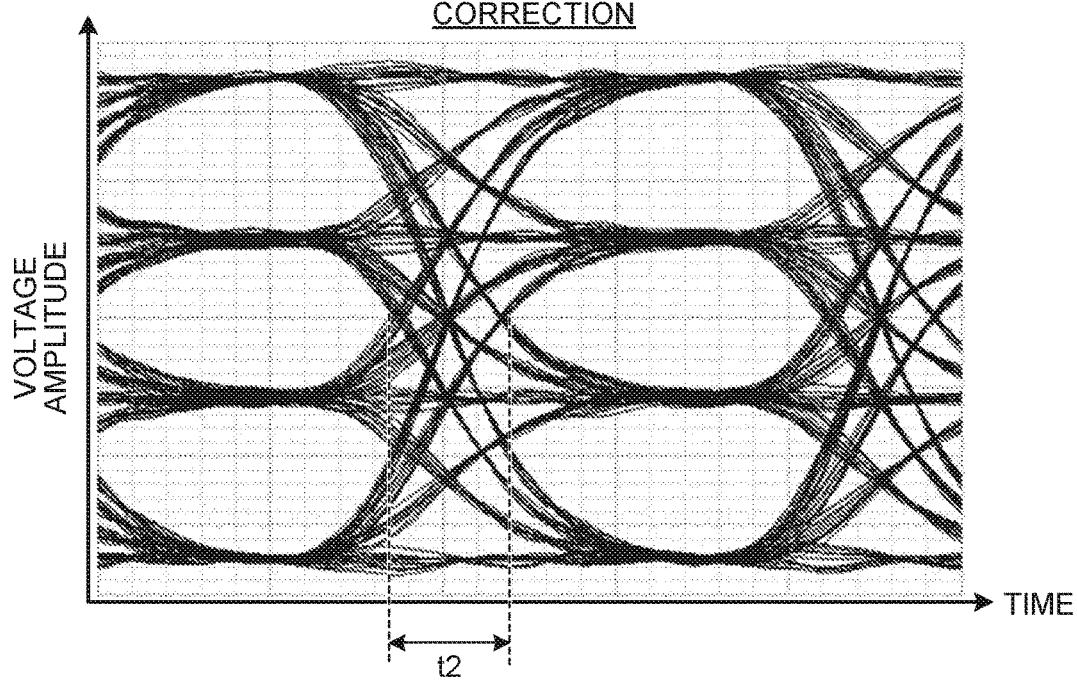

For example, as illustrated in FIG. 7A and FIG. 7B, waveform jitter derived from the IQ interference noise can be reduced. For example, if calculating a reduction ratio of a jitter time width t2 illustrated in FIG. 7B after correction with respect to a jitter time width t1 illustrated in FIG. 7A before the correction, it is understood that about 65% of the jitter can be reduced. FIG. 7A illustrates a waveform indicating a time change of a voltage amplitude of a signal before correction, and FIG. 7B illustrates a waveform indicating a time change of the voltage amplitude of a signal after correction.

Therefore, when quadrature modulation (for example, QPSK) is used as the data modulation method of the wired communication, the IQ interference noise at the time of using a wide band can be removed, and a usable signal band can be expanded. Accordingly, because multi-carrier communication can be used in a wide band, the communication speed of the wired communication can be easily improved.

Figure 8:
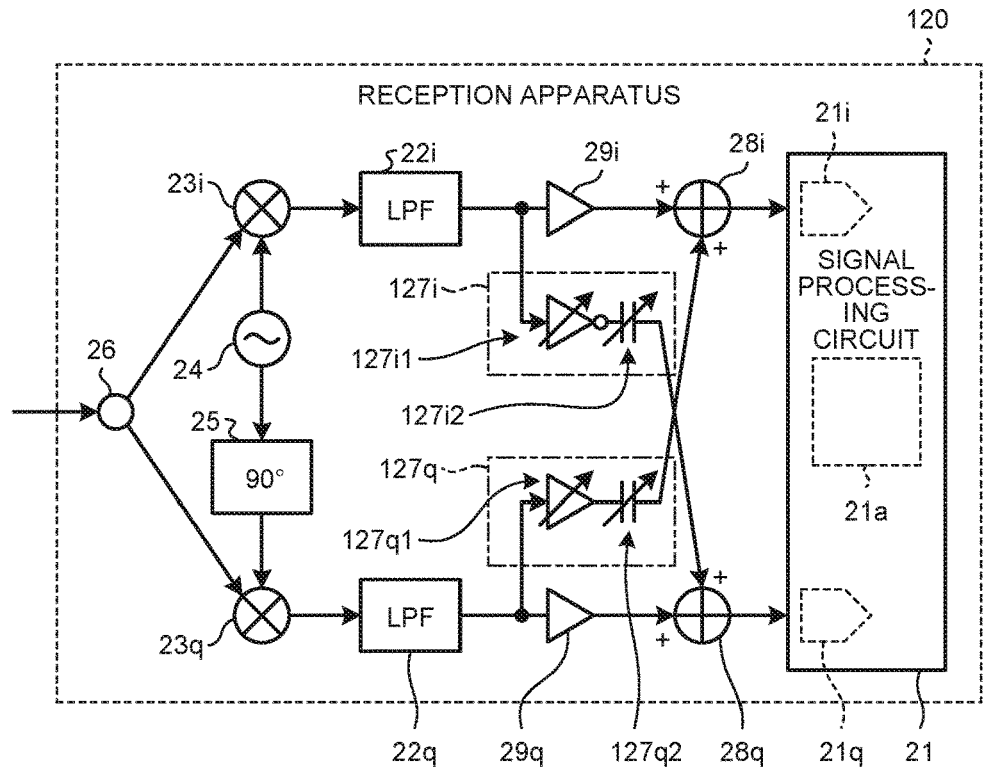
FIG. 8 is a diagram illustrating a circuit configuration of a reception apparatus in a modification of the first embodiment.

It should be noted that, as illustrated in FIG. 8, in a reception apparatus 120, a correction circuit 127$i$ can include a reverse-phase variable amplifier 127$i$1 and a variable capacitative element 127$i$2, and a correction circuit 127$q$ can include a positive-phase variable amplifier 127$q$1 and a variable capacitative element 127$q$2. In the reverse-phase variable amplifier 127$i$1 and the positive-phase variable amplifier 127$q$1, the gains are variable, respectively. In the variable capacitative element 127$i$2 and the variable capacitative element 127$q$2, the capacitance values are variable, respectively. In this case, the gain of the reverse-phase variable amplifier 127$i$1 and the capacitance value of the variable capacitative element 127$q$2 can be dynamically changed so as to properly perform the calculation to obtain $dRXBB_I/dt$ in Formula 23 by differentiating $RXBB_I$ in Formula 17 and the calculation to multiply $dRXBB_I/dt$ in Formula 23 by $H_{comp}$ in Formula 21. The gain of the positive-phase variable amplifier 127$q$1 and the capacitance value of the variable capacitative element 127$q$2 can be dynamically changed so as to properly perform the calculation to obtain $dRXBB_Q/dt$ in Formula 20 by differentiating $RXBB_Q$ in Formula 18 and the calculation to multiply $dRXBB_Q/dt$ in Formula 20 by $H_{comp}$ in Formula 21.

For example, the gain of the reverse-phase variable amplifier 127$i$1 and the capacitance value of the variable capacitative element 127$qi$ can be dynamically changed corresponding to a change of environmental conditions such as an ambient temperature of the reception apparatus 120 (by feed-forward control, for example, using a table in which environmental conditions and a value to be changed are associated with each other). The gain of the positive-phase variable amplifier 127$q$1 and the capacitance value of the variable capacitative element 127$q$2 can be dynamically changed corresponding to a change of environmental conditions such as an ambient temperature of the reception apparatus 120 (by feed-forward control, for example, using a table in which environmental conditions and a value to be changed are associated with each other). At this time, a sensor that detects environmental conditions (for example, a temperature sensor) can be additionally provided.

Figure 9:
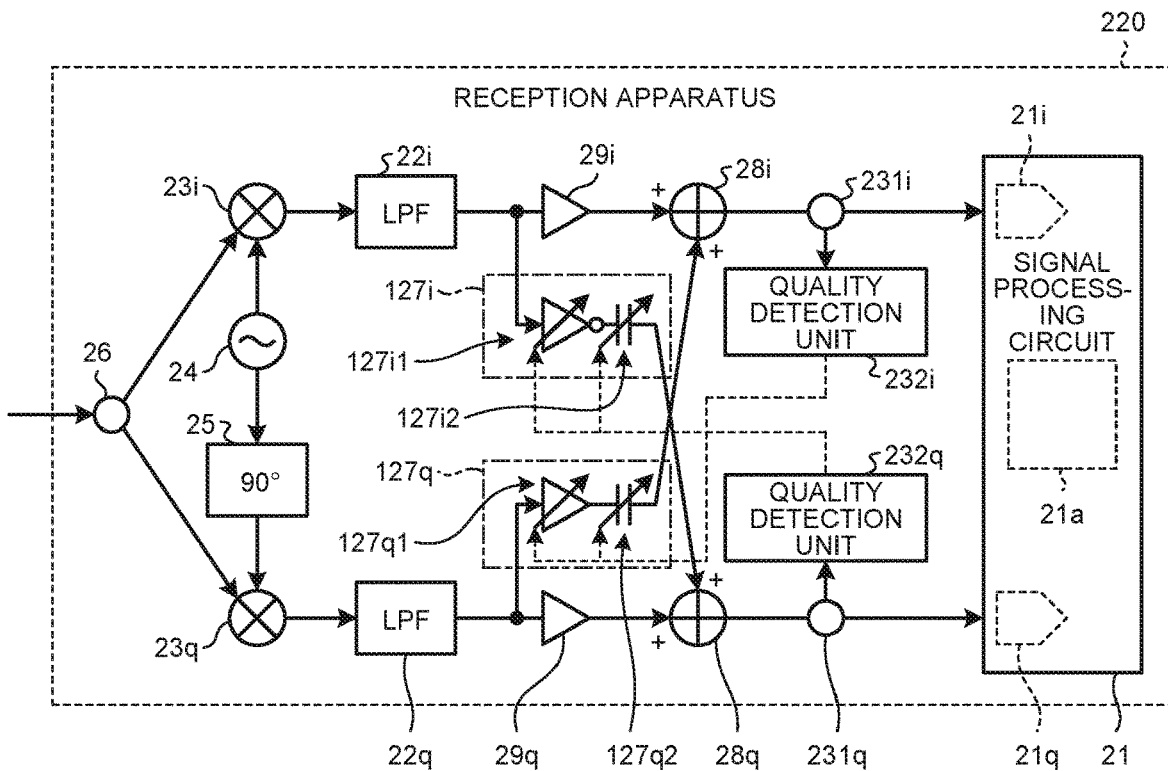
FIG. 9 is a diagram illustrating a circuit configuration of a reception apparatus in another modification of the first embodiment.

Alternatively, as illustrated in FIG. 9, in a reception apparatus 220, the gains of the reverse-phase variable amplifier 127$i$1 and the positive-phase variable amplifier 127$q$1, and the capacitive values of the variable capacitative element 127$i$2 and the variable capacitative element 127$q$2 can be adaptively controlled. That is, the reception apparatus 220 further includes quality detection units 232$i$ and 232$q$.

The quality detection unit 232$i$ detects power or the like of the signal transferred from the adder circuit 28$i$ to the signal processing circuit 21 by a detection node 231$i$, in order to evaluate the signal S/N ratio by comparing the power with preset target power of the signal. The quality detection unit 232$i$ decides the gain of the positive-phase variable amplifier 127$q$1 and the capacitance value of the variable capacitative element 127$q$2 according to the evaluation result (for example, so that the signal S/N ratio approaches the target value), and supplies control signals to the positive-phase variable amplifier 127$q$1 and the variable capacitative element 127$q$2, respectively. Accordingly, the positive-phase variable amplifier 127$q$1 changes the value of the gain to a value corresponding to the control signal, and the variable capacitative element 127$q$2 changes the capacitance value thereof to a value corresponding to the control signal.

Similarly, the quality detection unit 232$q$ detects power or the like of the signal transferred from the adder circuit 28$q$ to the signal processing circuit 21 by a detection node 231$q$, in order to evaluate the signal S/N ratio by comparing the power with preset target power of the signal. The quality detection unit 232$q$ decides the gain of the reverse-phase variable amplifier 127$i$1 and the capacitance value of the variable capacitative element 127$i$2 according to the evaluation result (for example, so that the signal S/N ratio approaches the target value), and supplies control signals to the reverse-phase variable amplifier 127$i$1 and the variable capacitative element 127$i$2, respectively. Accordingly, the reverse-phase variable amplifier 127$i$1 changes the value of the gain to a value corresponding to the control signal, and the variable capacitative element 127$i$2 changes the capacitance value thereof to a value corresponding to the control signal.

In this way, the gain of the reverse-phase variable amplifier 127$i$1 and the capacitance value of the variable capacitative element 127$i$2 can be adaptively changed according to the quality of the reception signal. The gain of the positive-phase variable amplifier 127$q$1 and the capacitance value of the variable capacitative element 127q2 can be adaptively changed according to the quality of the reception signal.

Therefore, according to such a configuration, when quadrature modulation (for example, QPSK) is used as the data modulation method of the wired communication, the IQ interference noise at the time of using a wide band can be removed, and a usable signal band can be expanded. Accordingly, because multi-carrier communication can be used in a wide band, the communication speed of the wired communication can be easily improved.

Second Embodiment

Figure 10:
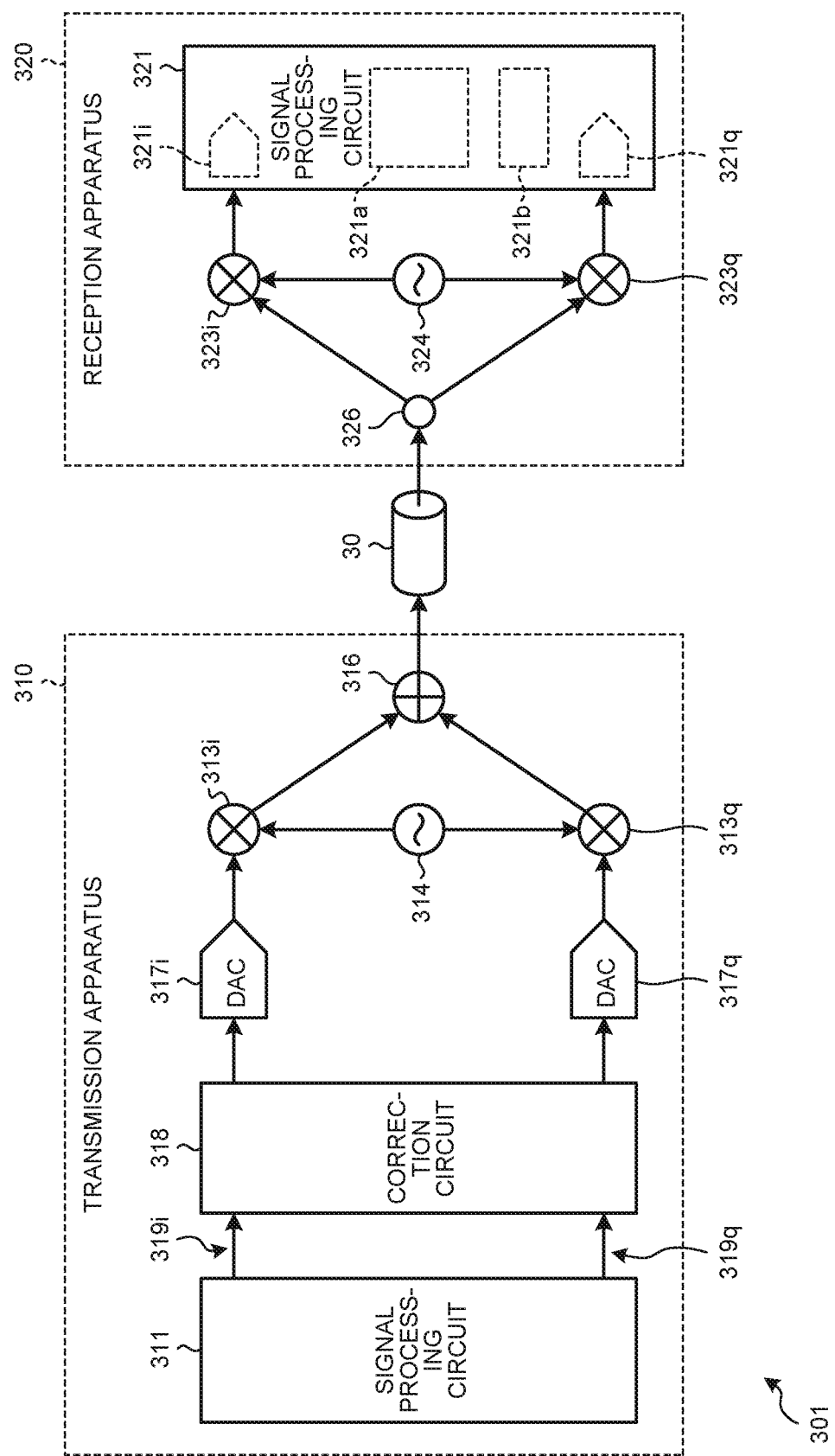
FIG. 10 is a diagram illustrating a block configuration of a transmission apparatus and a reception apparatus in a second embodiment.

Next, a communication system 301 according to a second embodiment is described with reference to FIG. 10. FIG. 10 is a diagram illustrating a configuration of the communication system 301. In the following descriptions, differences from the first embodiment are mainly explained.

According to the first embodiment, compensation of the IQ interference noise is performed on the reception apparatus 20 in the communication system 1. However, according to the second embodiment, compensation of the IQ interference noise is performed on a transmission apparatus 310 in the communication system 301.

The communication system 301 includes the transmission apparatus 310, the wired communication channel 30, and a reception apparatus 320. The transmission apparatus 310 is configured to perform quadrature modulation to the signal digitally. The transmission apparatus 310 includes a signal processing circuit 311, a correction circuit 318, DA conversion circuits (DAC) 317i and 317q, frequency conversion circuits 313i and 313q, an oscillator 314, and an adder 316. The signal processing circuit 311 includes a processing unit 311a and a digital modulation unit 311b.

The reception apparatus 320 is configured to perform quadrature modulation to the signal digitally. The reception apparatus 320 includes a divider 326, an oscillator 324, frequency conversion circuits 323i and 323q, and a signal processing circuit 321. The signal processing circuit 321 includes a processing unit 321a, a digital demodulation unit 321b, and AD conversion units 321i and 321q.

In the transmission apparatus 310, the signal processing circuit 311 supplies an I-component (in-phase component) baseband signal $TXBB_I$ to the correction circuit 318 via a line 319i, and supplies a Q-component (quadrature component) baseband signal $TXBB_Q$ to the correction circuit 318 via a line 319q.

The correction circuit 318 corrects the baseband signal $TXBB_I$ (first value) so as to compensate the IQ interference noise by using the baseband signal $TXBB_Q$ (second value), thereby generating a corrected baseband signal $TXBB_I$ (third value). With this process, the correction circuit 318 corrects the baseband signal $TXBB_Q$ (second value) so as to compensate the IQ interference noise by using the baseband signal $TXBB_I$ (first value), thereby generating a corrected baseband signal $TXBB_Q$ (fourth value).

Figure 11:
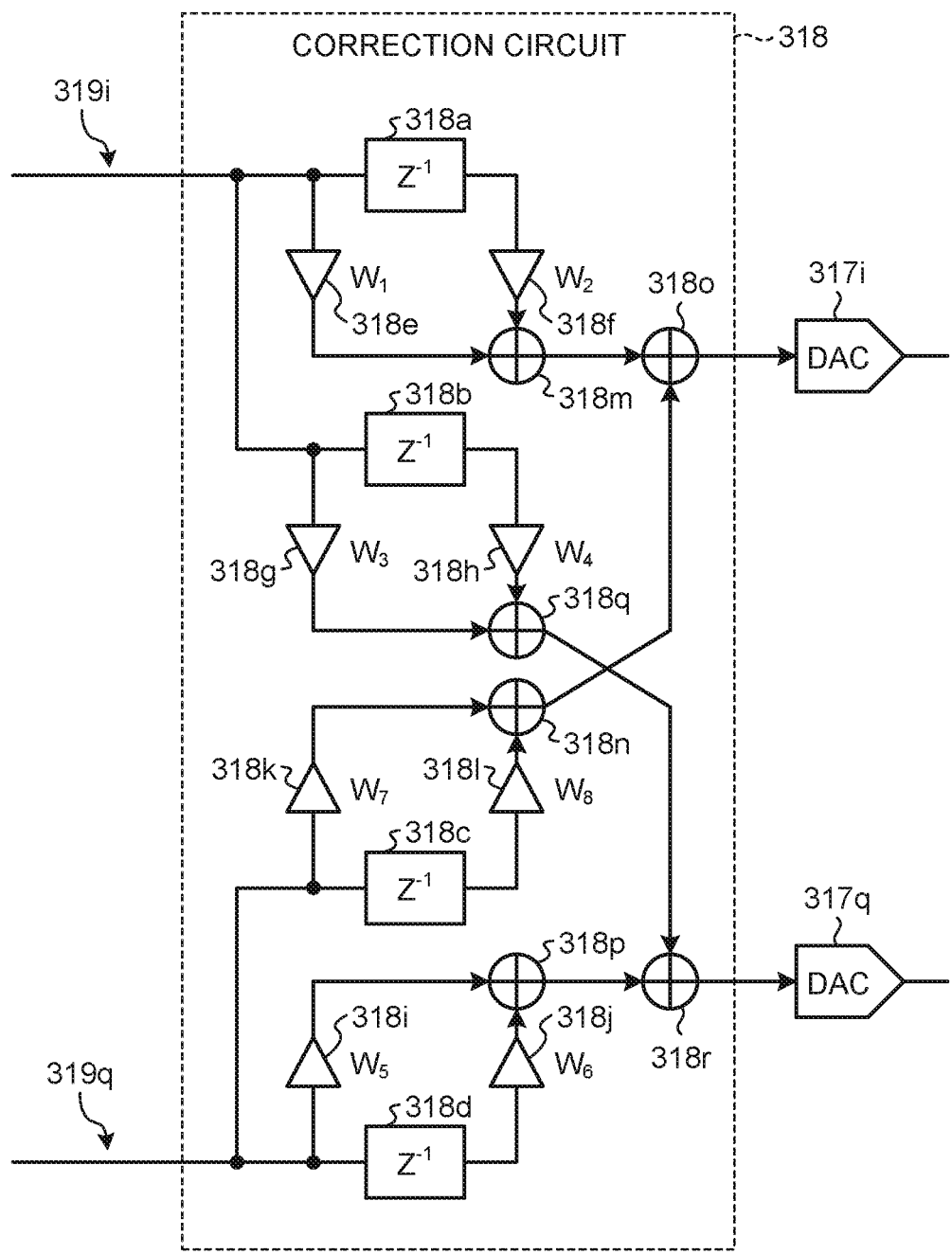
FIG. 11 is a circuit diagram illustrating a configuration example of a correction circuit in the second embodiment.

For example, the correction circuit 318 can be realized by an FIR (Finite Impulse Response) filter as illustrated in FIG. 11. FIG. 11 is a circuit diagram illustrating a configuration example of the correction circuit 318. The correction circuit 318 includes a plurality of delay elements 318a to 318d, a plurality of multipliers 318e to 318l, and a plurality of adders 318m to 318r.

For example, in order to discriminate values at different sampling timings of the baseband signal $TXBB_I$, an Nth sampled signal is expressed as a baseband signal $TXBB_I(n)$.

The multiplier 318e multiplies the baseband signal $TXBB_I(n)$ by a weight coefficient $W_1$ to generate a signal $W_1 \times TXBB_I(n)$, and supplies the signal $W_1 \times TXBB_I(n)$ to the adder 318m. The multiplier 318f multiplies a baseband signal $TXBB_I(n-1)$ one sample before, which has been delayed by the delay element 318a, by a weight coefficient $W_2$ to generate a signal $W_2 \times TXBB_I(n-1)$, and supplies the signal $W_2 \times TXBB_I(n-1)$ to the adder 318m. The adder 318m adds the signal $W_1 \times TXBB_I(n)$ and the signal $W_2 \times TXBB_I(n-1)$ and supplies a signal $W_1 \times TXBB_I(n)+W_2 \times TXBB_I(n-1)$ to the adder 318o.

The multiplier 318k multiplies a baseband signal $TXBB_Q(n)$ by a weight coefficient $W_7$ to generate a signal $W_7 \times TXBB_Q(n)$, and supplies the signal $W_7 \times TXBB_Q(n)$ to the adder 318n. The multiplier 318l multiplies a baseband signal $TXBB_Q(n-1)$ one sample before, which has been delayed by the delay element 318c, by a weight coefficient $W_8$ to generate a signal $W_8 \times TXBB_Q(n-1)$, and supplies the signal $W_8 \times TXBB_Q(n-1)$ to the adder 318n. The adder 318n adds the signal $W_7 \times TXBB_Q(n)$ and the signal $W_8 \times TXBB(n-1)$ and supplies a signal $W_7 \times TXBB_Q(n)+W_8 \times TXBB_Q(n-1)$ to the adder 318o.

The adder 318o adds the signal $W_1 \times TXBB_I(n)+W_2 \times TXBB_Q(n-1)$ and the signal $W_7 \times TXBB_Q(n)+W_8 \times TXBB_Q(n-1)$ and acquires an addition result $W_1 \times TXBB_I(n)+W_2 \times TXBB_I(n-1)+W_7 \times TXBB_Q(n)+W_8 \times TXBB_Q(n-1)$ as a baseband signal $TXBB_I$ after correction (with IQ interference noise being compensated).

Here, the coefficients $W_1$, $W_2$, $W_7$, and $W_8$ can be experimentally adjusted in advance so as to perform calculation on the reception apparatus 320, corresponding to the calculation to obtain $dRXBB_Q/dt$ in Formula 20 by differentiating $RXBB_Q$ in Formula 18 and the calculation to multiply $dRXBB_Q/dt$ in Formula 20 by $H_{comp}$ in Formula 21, on the transmission apparatus 310. That is, an FIR filter (first filter circuit) that corrects the baseband signal $TXBB_I$ (first value) so as to compensate the IQ interference noise by using the baseband signal $TXBB_Q$ (second value), thereby generating the corrected baseband signal $TXBB_I$ (third value) can be configured by combining at least one coefficient ($W_1$, $W_2$, $W_7$, and $W_8$), at least one delay element, and at least one adder.

Similarly, the multiplier 318i multiplies the baseband signal $TXBB_Q(n)$ by a weight coefficient $W_5$ to generate a signal $W_5 \times TXBB_Q(n)$, and supplies the signal $W_5 \times TXBB_Q(n)$ to the adder 318p. The multiplier 318j multiplies a baseband signal $TXBB_Q(n-1)$ one sample before, which has been delayed by the delay element 318d, by a weight coefficient $W_6$ to generate a signal $W_6 \times TXBB_Q(n-1)$, and supplies the signal $W_6 \times TXBB_Q(n-1)$ to the adder 318p. The adder 318p adds the signal $W_5 \times TXBB_Q(n)$ and the signal $W_6 \times TXBB_Q(n-1)$ and supplies a signal $W_5 \times TXBB_Q(n)+W_6 \times TXBB_Q(n-1)$ to the adder 318r.

The multiplier 318g multiplies a baseband signal $TXBB_I(n)$ by a weight coefficient $W_3$ to generate a signal $W_3 \times TXBB_I(n)$, and supplies the signal $W_3 \times TXBB_I(n)$ to the adder 318q. The multiplier 318h multiplies a baseband signal $TXBB_I(n-1)$ one sample before, which has been delayed by the delay element 318b, by a weight coefficient $W_4$ to generate a signal $W_4 \times TXBB_I(n-1)$, and supplies the signal $W_4 \times TXBB_I(n-1)$ to the adder 318q. The adder 318q adds the signal $W_3 \times TXBB_I(n)$ and the signal $W_4 \times TXBB_I(n-1)$ and supplies a signal $W_3 \times TXBB_I(n)+W_4 \times TXBB_I(n-1)$ to the adder 318r.

The adder 318r adds the signal $W_5 \times TXBB_Q(n)+W_6 \times TXBB_Q(n-1)$ and the signal $W_3 \times TXBB_I(n)+W_4 \times TXBB_I(n-1)$ and acquires an addition result $W_5 \times TXBB_Q(n)+W_6 \times$ $TXBB_Q(n-1)+W_3 \times TXBB_I(n)+W_4 \times TXBB_I(n-1)$ as a baseband signal $TXBB_Q$ after correction (with IQ interference noise being compensated).

Here, the coefficients $W_3$, $W_4$, $W_5$, and $W_6$ can be experimentally adjusted in advance so as to perform calculation on the reception apparatus 320, corresponding to the calculation to obtain $dRXBB_I/dt$ in Formula 23 by differentiating $RXBB_I$ in Formula 17 and the calculation to multiply $dRXBB_I/dt$ in Formula 23 by $H_{comp}$ in Formula 21, on the transmission apparatus 310. That is, an FIR filter (second filter circuit) that corrects the baseband signal $TXBB_Q$ (second value) so as to compensate the IQ interference noise by using the baseband signal $TXBB_I$ (first value), thereby generating the corrected baseband signal $TXBB_Q$ (fourth value) can be configured by combining at least one coefficient ($W_3$, $W_4$, $W_5$, and $W_e$), at least one delay element, and at least one adder.

Figure 12:
FIG. 12 is a diagram illustrating another configuration example of the correction circuit in the second embodiment.

Alternatively, for example, the correction circuit 318 can be realized by performing correction using a table 3181 as illustrated in FIG. 12. FIG. 12 is a diagram illustrating another configuration example of the correction circuit 318. The table 3181 includes an input I-component column 3181a, an input Q-component column 3181b, an output I-component column 3181c, and an output Q-component column 3181d. In the input I-component column 3181a, values TIin1, TIin2, . . . of the baseband signal $TXBB_I$, which become candidates to be input to the correction circuit 318, are recorded. In the input Q-component column 3181b, values TQin1, TQin2, . . . of the baseband signal $TXBB_Q$, which become candidates to be input to the correction circuit 318, are recorded. In the output I-component column 3181c, values TIout1, TIout2, . . . of the baseband signal $TXBB_I$ to be replaced with respect to a combination of the baseband signal $TXBB_I$ and the baseband signal $TXBB_Q$ to be input are recorded. In the output Q-component column 3181d, values TQout1, TQout2, . . . of the baseband signal $TXBB_Q$ to be replaced with respect to a combination of the baseband signal $TXBB_I$ and the baseband signal $TXBB_Q$ to be input are recorded.

The correction circuit 318 refers to the table 3181 to replace the baseband signal $TXBB_I$ with a baseband signal $TXBB_I$ after correction (with IQ interference noise being compensated), and replace the baseband signal $TXBB_Q$ with a baseband signal $TXBB_Q$ after correction (with IQ interference noise being compensated), corresponding to the combination of the baseband signal $TXBB_I$ and the baseband signal $TXBB_Q$ received from the signal processing circuit 311.

The correction circuit 318 illustrated in FIG. 10 supplies the corrected baseband signal $TXBB_I$ to the DAC 317i, and supplies the corrected baseband signal $TXBB_Q$ to the DAC 317q. The DAC 317i performs DA conversion of the baseband signal $TXBB_I$ and supplies the DA-converted baseband signal $TXBB_I$ to the frequency conversion circuit 313i. The DAC 317q performs DA conversion of the baseband signal $TXBB_Q$ and supplies the DA-converted baseband signal $TXBB_Q$ to the frequency conversion circuit 313q. The frequency conversion circuit 313i performs frequency conversion of the baseband signal $TXBB_I$ with a local signal $TXLO_I$ received from the oscillator 314 and supplies the frequency-converted baseband signal $TXBB_I$ to the adder 316. The frequency conversion circuit 313q performs frequency conversion of the baseband signal $TXBB_Q$ with a local signal $TXLO_Q$ received from the oscillator 314 and supplies the frequency-converted baseband signal $TXBB_Q$ to the adder 316. The adder 316 adds the signal received from the frequency conversion circuit 313i and the signal received from the frequency conversion circuit 313q to generate a communication signal, and transmits the communication signal to the reception apparatus 320 via the wired communication channel 30.

In the reception apparatus 320, the divider (reception node) 326 receives the communication signal from the transmission apparatus 310 via the wired communication channel 30, divides the received communication signal into two signals for the I component and the Q component, and supplies the I-component signal to the frequency conversion circuit 323i and the Q-component signal to the frequency conversion circuit 323q. The frequency conversion circuit 323i performs frequency conversion of the I-component signal with a local signal $RXLO_I$ received from the oscillator 324 and supplies the frequency-converted baseband signal $RXBB_I$ to the signal processing circuit 321. The frequency conversion circuit 323q performs frequency conversion of the Q-component signal with a local signal $RXLO_Q$ received from the oscillator 324 and supplies the frequency-converted baseband signal $RXBB_Q$ to the signal processing circuit 321.

In the signal processing circuit 321, the AD conversion unit 321i performs AD conversion of the signal supplied from the frequency conversion circuit 323i to generate a digital signal, and supplies the digital signal to the processing unit 321a. The AD conversion unit 321q performs AD conversion of the signal supplied from the frequency conversion circuit 323q to generate a digital signal, and supplies the digital signal to the processing unit 321a. The processing unit 321a performs digital signal processing to the respective digital signals for the I component and the Q component and supplies the respective digital signals to the digital demodulation unit 321b. The digital demodulation unit 321b performs digital quadrature demodulation processing to the digital signals to acquire desired signals.

As described above, according to the second embodiment, in the transmission apparatus 310, the correction circuit 318 corrects the baseband signal $TXBB_I$(first value) so as to compensate the IQ interference noise by using the baseband signal $TXBB_Q$ (second value), thereby generating a corrected baseband signal $TXBB_I$ (third value) With this process, the correction circuit 318 corrects the baseband signal $TXBB_Q$ (second value) so as to compensate the IQ interference noise by using the baseband signal $TXBB_I$ (first value), thereby generating a corrected baseband signal $TXBB_Q$ (fourth value). Accordingly, the IQ interference noise can be compensated digitally, and the IQ interference noise at the time of using a wide band can be removed.

Figure 13A:
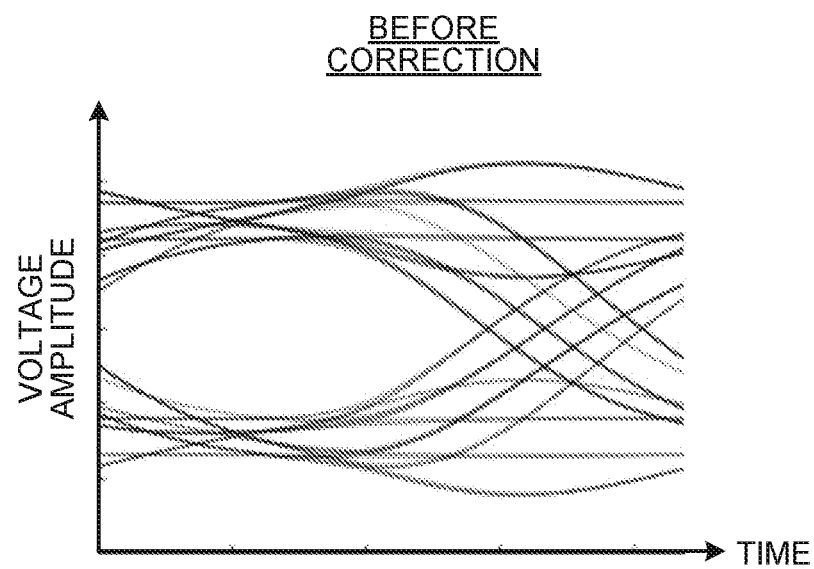
FIG. 13A to FIG. 13D are diagrams illustrating operations of a communication system in the second embodiment.
Figure 13B:
Figure 13B:
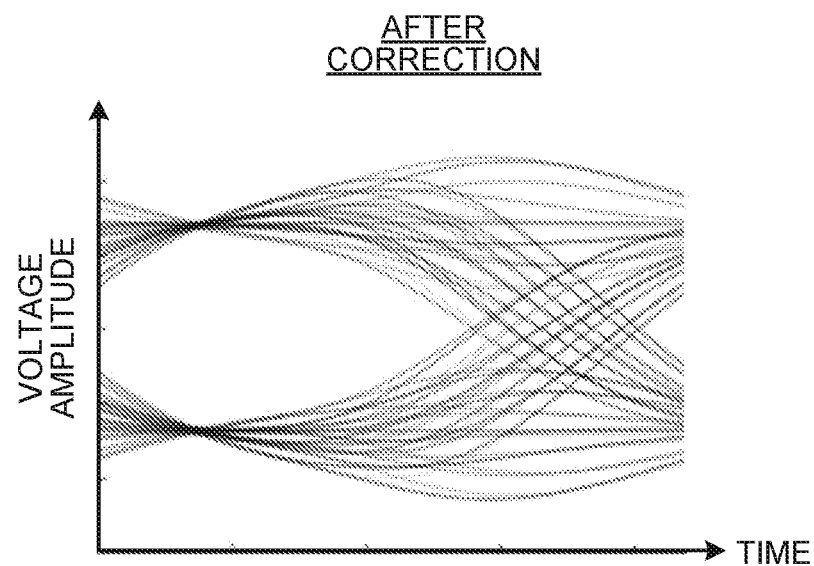
Figure 13C:
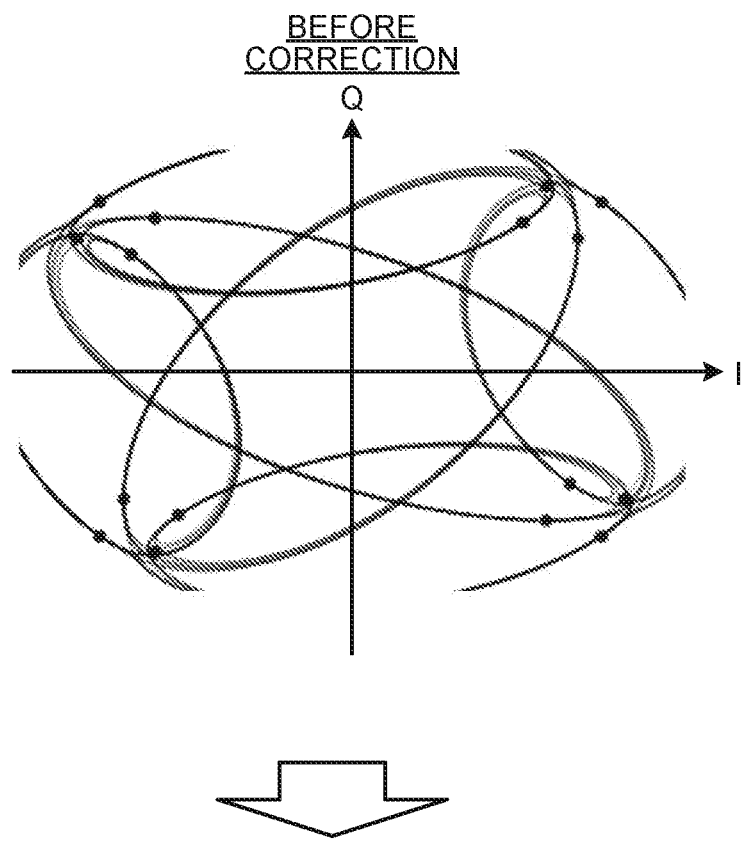
Figure 13D:
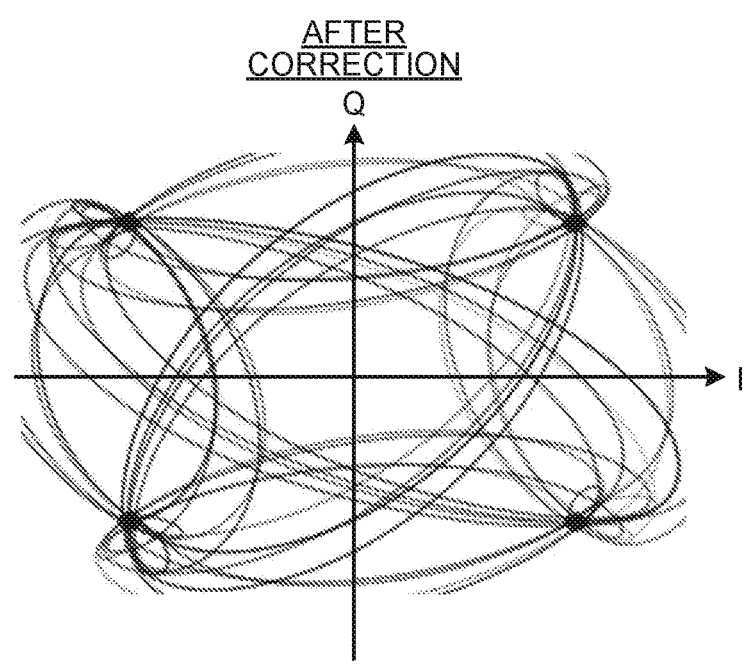

For example, as illustrated in FIG. 13A and FIG. 13B, waveform jitter derived from the IQ interference noise can be reduced. FIG. 13A illustrates a waveform indicating a time change of a voltage amplitude of a signal before correction, and FIG. 13B illustrates a waveform indicating a time change of the voltage amplitude of a signal after correction. Further, as illustrated in FIG. 13C and FIG. 13D, dispersion of respective symbol levels derived from the IQ interference noise can be reduced. FIG. 13C is an IQ plan view illustrating levels of the respective symbols before correction, and FIG. 13D is an IQ plan view illustrating levels of the respective symbols after correction.

Therefore, when quadrature modulation (for example, QPSK) is used as the data modulation method of the wired communication, the IQ interference noise at the time of using a wide band can be removed, and a usable signal band can be expanded. Accordingly, because multi-carrier communication can be used in a wide band, the communication speed of the wired communication can be easily improved.

Figure 14A:
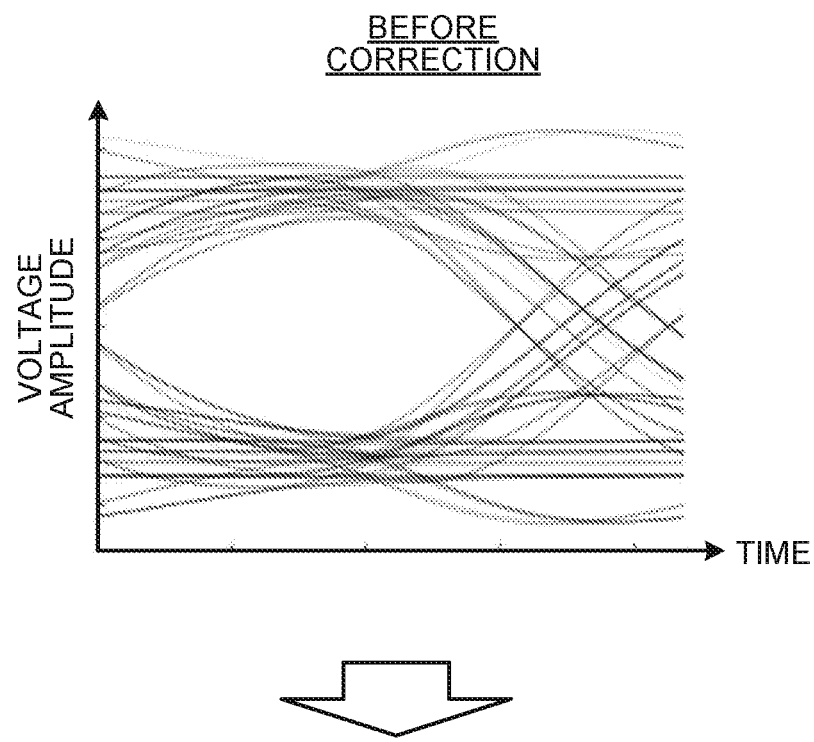
FIG. 14A to FIG. 14D are diagrams illustrating operations of the communication system in the second embodiment.
Figure 14B:
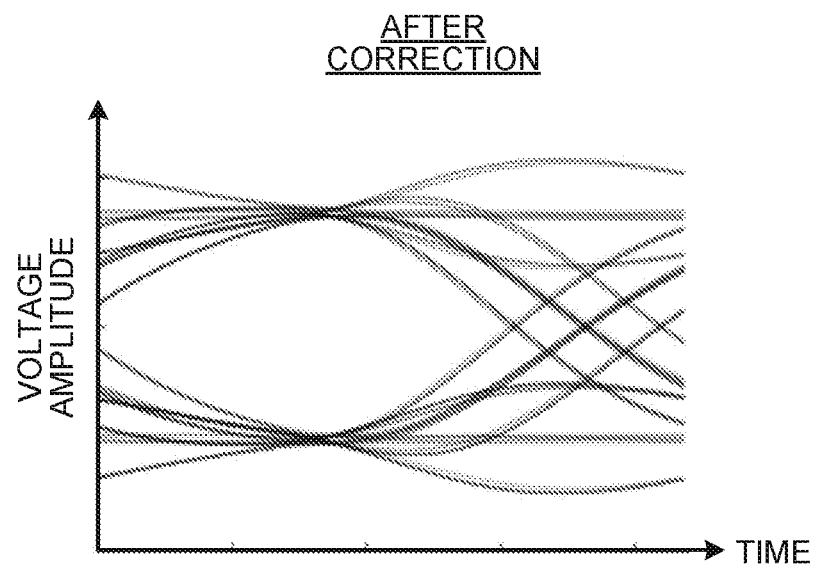
Figure 14C:
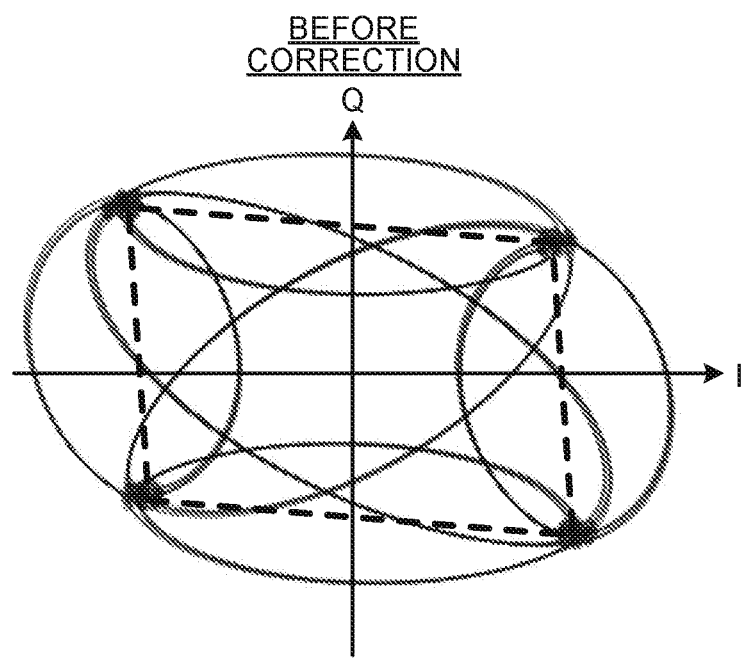
Figure 14D:
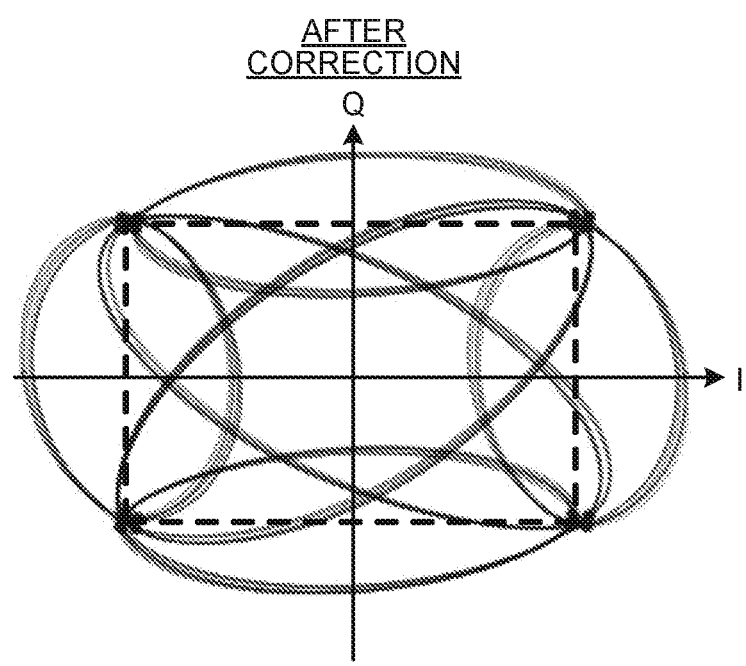

It should be noted that the correction circuit 318 can be used not only for compensation of IQ interference noise, but also for compensation of IQ mismatch and compensation of interference between symbols. For example, by experimentally adjusting and deciding the respective coefficients $W_1$ to $W_8$ illustrated in FIG. 11, compensation of interference between symbols can be realized as illustrated in FIG. 14A and FIG. 14B. Alternatively, for example, by experimentally adjusting and deciding the respective coefficients $W_1$ to $W_8$ illustrated in FIG. 11, IQ mismatch can be realized as illustrated in FIG. 14C and FIG. 14D. For example, a state in which four symbols are distributed in a parallelogram shape on an IQ plane as illustrated in FIG. 14C can be corrected to a state in which four symbols are distributed in a rectangular shape on an IQ plane as illustrated in FIG. 14D.

The adjustment (update of coefficients) of the respective coefficients $W_1$ to $W_8$ illustrated in FIG. 11 can be performed dynamically. For example, in advance calibration (for example, at the time of startup or at the head of a data frame), coefficients of the correction circuit (complex FIR filter) 318 provided in the transmission apparatus 310 are adjusted by using an LMS (Least Mean Square) algorithm so that a difference between the reception signal and an ideal value decreases, by using a known training signal. At the time of use (during data transmission and reception), the correction circuit can be configured to fix the coefficients.

Figure 15:
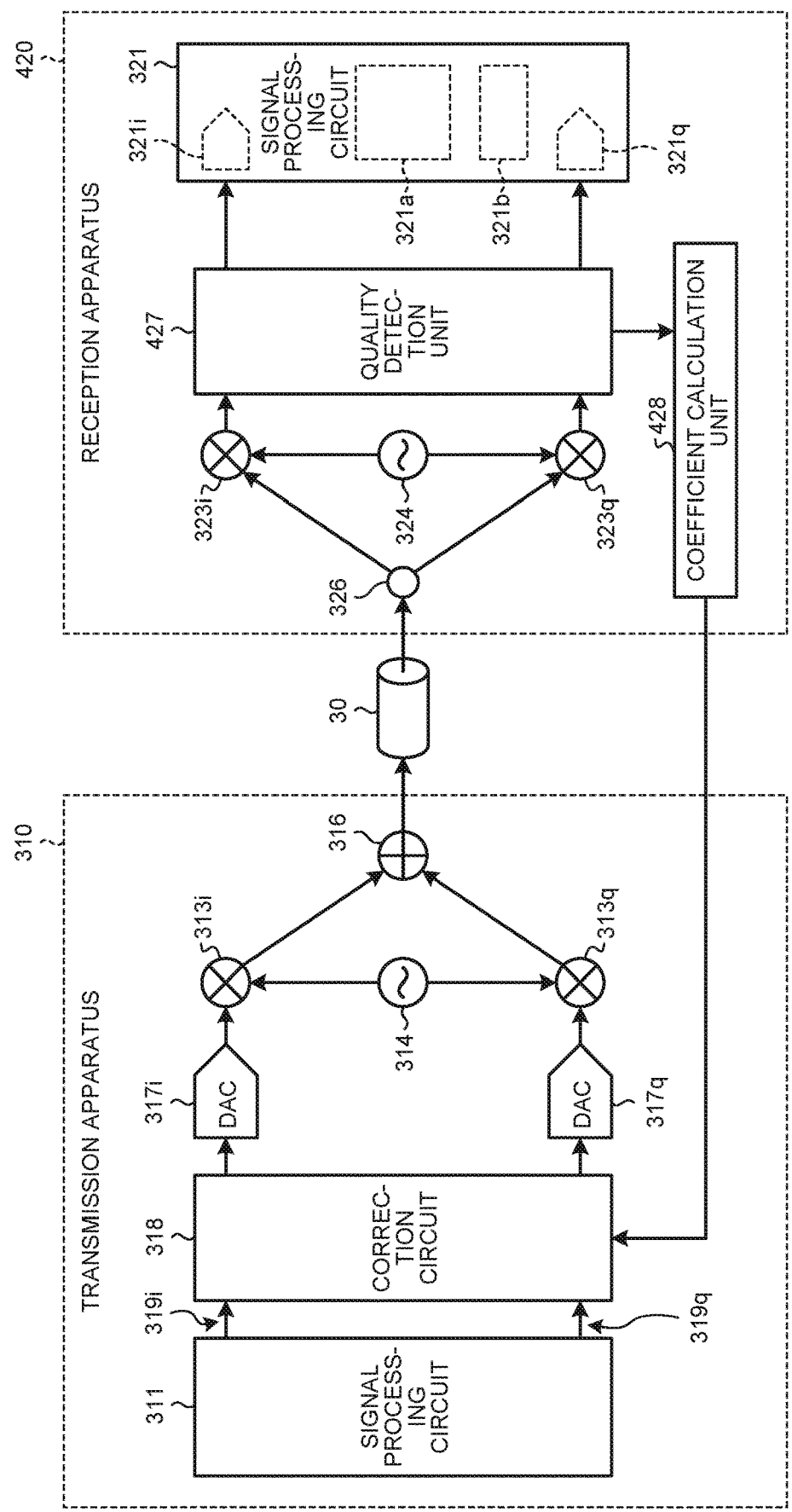
FIG. 15 is a diagram illustrating a block configuration of a transmission apparatus and a reception apparatus in a modification of the second embodiment.

For example, as illustrated in FIG. 15, a quality detection unit 427 and a coefficient calculation unit 428 are added in a reception apparatus 420. It is assumed that the correction circuit 318 in the transmission apparatus 310 is realized by the FIR filter as illustrated in FIG. 11. The quality detection unit 427 is electrically inserted between the frequency conversion circuits 323$i$, 323$q$ and the signal processing circuit 321. The quality detection unit 427 transfers the baseband signal RXBB$_I$ from the frequency conversion circuit 323$i$ to the signal processing circuit 321 and evaluates the quality of the baseband signal RXBB$_I$. The quality detection unit 427 transfers the baseband signal RXBB$_Q$ from the frequency conversion circuit 323$q$ to the signal processing circuit 321 and evaluates the quality of the baseband signal RXBB$_Q$.

The quality detection unit 427 evaluates the signal S/N ratio by comparing the signal with preset target power of the signal. The quality detection unit 427 supplies the evaluation result to the coefficient calculation unit 428. The coefficient calculation unit 428 calculates the respective coefficients $W_1$ to $W_8$ according to the evaluation result by the quality detection unit 427 (for example, so that the signal S/N ratio approaches the target value).

For example, the respective coefficients $W_1$ to $W_8$ can be expressed by a matrix W expressed by Formula 25.

$$W = \begin{pmatrix} W_1 & W_2 & W_3 & W_4 \\ W_5 & W_6 & W_7 & W_8 \end{pmatrix} \quad \text{(Formula 25)}$$

In this case, by performing calculation as expressed by Formula 26, the respective coefficients $W_1$ to $W_8$ can be updated.

$$W \leftarrow W - \lambda \begin{pmatrix} I'_n & -I'^*_n \\ Q'_n & -Q'^*_n \end{pmatrix} \begin{pmatrix} I_n \\ I_{n-1} \\ Q_n \\ Q_{n-1} \end{pmatrix} \quad \text{(Formula 26)}$$

In Formula 26, to discriminate values at different sampling timings of the baseband signals RXBB$_I$ and RXBB$_Q$, nth sampled signals are respectively expressed as $I_n$ and $Q_n$. In Formula 26, $\lambda$ is referred to as "step coefficient" and defines a step volume in coefficient update. A part on the right side of $\lambda$ expresses the rate and direction of temporal change of error. By the calculation expressed by Formula 26, the respective coefficients $W_1$ to $W_8$ can be updated according to the step volume defined by $\lambda$ in a direction of decreasing the error. That is, the respective coefficients $W_1$ to $W_8$ can be updated so that the values of the baseband signals RXBB$_I$ and RXBB$_Q$ converge to a target value.

The coefficient calculation unit 428 supplies the calculated respective coefficients $W_1$ to $W_8$ to the correction circuit 318 in the transmission apparatus 310. Accordingly, the correction circuit 318 updates the respective coefficients $W_1$ to $W_8$.

Further, when it can be determined that the values of the baseband signals RXBB$_I$ and RXBB$_Q$ have converged to the target value according to the evaluation result by the quality detection unit 427, the coefficient calculation unit 428 can stop update of the coefficients $W_1$ to $W_8$ and fix the coefficients $W_1$ to $W_8$. Further, the transmission apparatus 310 can be configured to hold the fixed coefficients $W_1$ to $W_8$ as a table, and adjust the coefficients of the correction circuit (complex FIR filter) 318 by referring to the table periodically or at the time of startup of the transmission apparatus 310. Accordingly, the correction circuit (for example, an FIR filter) 318 can perform coefficient update corresponding to a dynamic change of the transmission and reception environment.

Therefore, also by the configuration described above, when quadrature modulation (for example, QPSK) is used as the data modulation method of the wired communication, the IQ interference noise at the time of using a wide band can be removed, and the usable signal band can be expanded. Accordingly, because multi-carrier communication can be used in a wide band, the communication speed of the wired communication can be easily improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reception apparatus comprising:
   a reception node configured to be connected to a wired communication channel;
   a first frequency conversion circuit electrically connected to the reception node;
   a second frequency conversion circuit electrically connected to the reception node;
   a first adder circuit electrically connected to the first frequency conversion circuit;
   a second adder circuit electrically connected to the second frequency conversion circuit;
   a first correction circuit electrically connected between the first frequency conversion circuit and the second adder circuit; and a second correction circuit electrically connected between the second frequency conversion circuit and the first adder circuit, wherein the first correction circuit includes a reverse phase amplifier and a first capacitative element, and the second correction circuit includes a positive phase amplifier and a second capacitative element.

2. The reception apparatus according to claim 1, further comprising:

a first low-pass filter electrically connected between the first frequency conversion circuit and the first correction circuit; and a second low-pass filter electrically connected between the second frequency conversion circuit and the second correction circuit.

3. The reception apparatus according to claim 1, wherein the first frequency conversion circuit is configured to perform frequency conversion of a reception signal at the reception node with a first local signal to extract a first component, the second frequency conversion circuit is configured to perform frequency conversion of a reception signal at the reception node with a second local signal having a phase of 90 degrees different from that of the first local signal to extract a second component, a gain of the reverse phase amplifier and a capacitance value of the first capacitative element are set so that the first correction circuit is configured to differentiate the second component and to compensate interference of the second component with respect to the first component to generate a first correction value, a gain of the positive phase amplifier and a capacitance value of the second capacitative element are set so that the second correction circuit is configured to differentiate the first component and to compensate interference of the first component with respect to the second component to generate a second correction value, the first adder circuit is configured to add the extracted first component and the generated first correction value, and the second adder circuit is configured to add the extracted second component and the generated second correction value.

4. The reception apparatus according to claim 1, wherein a gain is variable in the reverse phase amplifier, a capacitance value is variable in the first capacitative element, a gain is variable in the positive phase amplifier, and a capacitance value is variable in the second capacitative element.

5. The reception apparatus according to claim 3, further comprising:

a first detection unit configured to detect signal quality of the first component by using an addition result of the first adder circuit; and a second detection unit configured to detect signal quality of the second component by using an addition result of the second adder circuit, wherein the reverse phase amplifier is configured to change a gain according to a detection result of the second detection unit, the first capacitative element is configured to change a capacitance value according to the detection result of the second detection unit, the positive phase amplifier is configured to change a gain according to a detection result of the first detection unit, and the second capacitative element is configured to change a capacitance value according to the detection result of the first detection unit.

6. The reception apparatus according to claim 1, further comprising:

a first detection unit configured to detect signal quality of a first component in a signal received by the reception apparatus, a first adjustment unit configured to adjust a first coefficient to be used for correcting the first value to generate the third value, according to the detected signal quality of the first component, a second detection unit configured to detect signal quality of a second component in the received signal, and a second adjustment unit configured to adjust a second coefficient to be used for correcting the second value to generate the fourth value, according to the detected signal quality of the second component.

7. A transmission apparatus comprising:

a correction circuit configured to correct a first value by using a second value to generate a third value, and correct the second value by using the first value to generate a fourth value;

a first frequency conversion circuit configured to perform frequency conversion of the third value by using a first local signal to generate a first signal;

a second frequency conversion circuit configured to perform frequency conversion of the fourth value by using a second local signal having a phase of 90 degrees different from that of the first local signal, thereby to generate a second signal; and a transmission node configured to be connected to a wired communication channel and output a transmission signal generated by combining the first signal and the second signal, wherein the correction circuit includes a first filter circuit configured to include at least one first coefficient, at least one first delay element, and at least one first adder; and a second filter circuit configured to include at least one second coefficient, at least one second delay element, and at least one second adder.

8. The transmission apparatus according to claim 7, wherein the transmission node is configured to be connected to a reception apparatus via the wired communication channel, and the at least one first coefficient and the at least one second coefficient are respectively set according to signal quality of a first component and signal quality of a second component in a signal received by the reception apparatus.

9. The transmission apparatus according to claim 7, wherein the correction circuit includes a table for replacing the first value with the third value and replacing the second value with the fourth value, according to a combination of the first value and the second value.

10. A communication system comprising:

a transmission apparatus; and a reception apparatus connected to the transmission apparatus via a wired communication channel, wherein the reception apparatus includes a reception node configured to be connected to the wired communication channel, a first frequency conversion circuit electrically connected to the reception node, a second frequency conversion circuit electrically connected to the reception node,
a first adder circuit electrically connected to the first frequency conversion circuit;
a second adder circuit electrically connected to the second frequency conversion circuit;
a first correction circuit electrically connected between the first frequency conversion circuit and the second adder circuit; and
a second correction circuit electrically connected between the second frequency conversion circuit and the first adder circuit, and wherein
the first correction circuit includes a reverse phase amplifier and a first capacitative element, and
the second correction circuit includes a positive phase amplifier and a second capacitative element.

11. The communication system according to claim 10, wherein
the reception apparatus further includes
a first low-pass filter electrically connected between the first frequency conversion circuit and the first correction circuit, and
a second low-pass filter electrically connected between the second frequency conversion circuit and the second correction circuit.

12. The communication system according to claim 10, wherein
the first frequency conversion circuit is configured to perform frequency conversion of a reception signal at the reception node with a first local signal to extract a first component,
the second frequency conversion circuit is configured to perform frequency conversion of a reception signal at the reception node with a second local signal having a phase of 90 degrees different from that of the first local signal to extract a second component,
a gain of the reverse phase amplifier and a capacitance value of the first capacitative element are set so that the first correction circuit is configured to differentiate the second component and to compensate interference of the second component with respect to the first component to generate a first correction value,
a gain of the positive phase amplifier and a capacitance value of the second capacitative element are set so that the second correction circuit is configured to differentiate the first component and to compensate interference of the first component with respect to the second component to generate a second correction value,
the first adder circuit is configured to add the extracted first component and the generated first correction value, and
the second adder circuit is configured to add the extracted second component and the generated second correction value.

13. The communication system according to claim 10, wherein
a gain is variable in the reverse phase amplifier,
a capacitance value is variable in the first capacitative element,
a gain is variable in the positive phase amplifier, and
a capacitance value is variable in the second capacitative element.

14. The communication system according to claim 12, wherein
the reception apparatus further includes a first detection unit configured to detect signal quality of the first component by using an addition result of the first adder circuit, and
a second detection unit configured to detect signal quality of the second component by using an addition result of the second adder circuit, and wherein
the reverse phase amplifier is configured to change a gain according to a detection result of the second detection unit,
the first capacitative element is configured to change a capacitance value according to the detection result of the second detection unit,
the positive phase amplifier is configured to change a gain according to a detection result of the first detection unit, and
the second capacitative element is configured to change a capacitance value according to the detection result of the first detection unit.

15. The communication system according to claim 10, wherein
the transmission apparatus includes
a third correction circuit configured to correct a first value by using a second value to generate a third vale, and correct the second value by using the first value to generate a fourth value,
a third frequency conversion circuit configured to perform frequency conversion of the third value by using a first local signal to generate a first signal,
a fourth frequency conversion circuit configured to perform frequency conversion of the fourth value by using a second local signal having a phase of 90 degrees different from that of the first local signal, thereby to generate a second signal, and
a transmission node configured to be connected to the wired communication channel and output a transmission signal generated by combining the first signal and the second signal.

16. The communication system according to claim 15, wherein
the correction circuit includes
a first filter circuit configured to include at least one first coefficient, at least one first delay element, and at least one first adder; and
a second filter circuit configured to include at least one second coefficient, at least one second delay element, and at least one second adder.

17. The communication system according to claim 16, wherein
the transmission node is configured to be connected to a reception apparatus via the wired communication channel, and
the at least one first coefficient and the at least one second coefficient are respectively set according to signal quality of a first component and signal quality of a second component in a signal received by the reception apparatus.

18. The communication system according to claim 15, wherein
the correction circuit includes a table for replacing the first value with the third value and replacing the second value with the fourth value, according to a combination of the first value and the second value.

19. The communication system according to claim 15, wherein
the reception apparatus further comprising:

a first detection unit configured to detect signal quality of a first component in a signal received by the reception apparatus, a first adjustment unit configured to adjust a first coefficient to be used for correcting the first value to generate the third value, according to the detected signal quality of the first component, a second detection unit configured to detect signal quality of a second component in the received signal, and a second adjustment unit configured to adjust a second coefficient to be used for correcting the second value to generate the fourth value, according to the detected signal quality of the second component.

* * * * *